(12) United States Patent
Matsuo et al.

(10) Patent No.: US 11,692,088 B2
(45) Date of Patent: Jul. 4, 2023

(54) RUBBER COMPOSITION

(71) Applicant: SUMITOMO CHEMICAL COMPANY, LIMITED, Tokyo (JP)

(72) Inventors: Kazumasa Matsuo, Osaka (JP); Natsuyo Kamimoto, Ichihara (JP); Tatsuhiko Adachi, Osaka (JP); Toshihiro Nobuoka, Ichihara (JP); Takeshi Hara, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 287 days.

(21) Appl. No.: 16/646,771

(22) PCT Filed: Sep. 7, 2018

(86) PCT No.: PCT/JP2018/033196
§ 371 (c)(1),
(2) Date: Mar. 12, 2020

(87) PCT Pub. No.: WO2019/054290
PCT Pub. Date: Mar. 21, 2019

(65) Prior Publication Data
US 2020/0207969 A1     Jul. 2, 2020

(30) Foreign Application Priority Data

Sep. 14, 2017  (JP) ................................. 2017-176911
Aug. 24, 2018  (JP) ................................. 2018-157683

(51) Int. Cl.
| | |
|---|---|
| *C08L 25/10* | (2006.01) |
| *B60C 1/00* | (2006.01) |
| *C08K 3/04* | (2006.01) |
| *C08K 3/36* | (2006.01) |
| *C08K 5/00* | (2006.01) |
| *C08K 5/378* | (2006.01) |
| *C08K 5/44* | (2006.01) |

(52) U.S. Cl.
CPC ................ *C08L 25/10* (2013.01); *B60C 1/00* (2013.01); *C08K 3/04* (2013.01); *C08K 3/36* (2013.01); *C08K 5/0025* (2013.01); *C08K 5/378* (2013.01); *C08K 5/44* (2013.01)

(58) Field of Classification Search
CPC .. C08L 25/10; C08K 3/04; C08K 5/44; C08K 5/378; C08K 3/36

USPC .......................................................... 523/156
See application file for complete search history.

(56) References Cited

U.S. PATENT DOCUMENTS

| | | | |
|---|---|---|---|
| 6,646,029 B1 * | 11/2003 | Lin ......................... | C08K 5/37 524/83 |
| 2008/0194760 A1 * | 8/2008 | Hochi ...................... | C08L 9/06 524/579 |

FOREIGN PATENT DOCUMENTS

| | | | |
|---|---|---|---|
| JP | 2004-500471 A | | 1/2004 |
| JP | 2010-018715 A | | 1/2010 |
| JP | 2010-18716 | * | 1/2010 |
| JP | 2010-018716 A | | 1/2010 |
| JP | 2011-089031 A | | 5/2011 |
| JP | 2014-009249 A | | 1/2014 |
| JP | 2014-009250 A | | 1/2014 |
| JP | 2014-009251 A | | 1/2014 |
| SU | 1106816 A | | 8/1984 |
| WO | WO 01/70870 | * | 9/2001 |

OTHER PUBLICATIONS

Machine translation of JP 2010-18716 (Year: 2010).*
International Searching Authority, "International Search Report," issued in connection with International Patent Application No. PCT/JP2018/033196, dated Nov. 20, 2018.
International Searching Authority, "Written Opinion," issued in connection with International Patent Application No. PCT/JP2018/033196, dated Nov. 20, 2018.

* cited by examiner

*Primary Examiner* — Doris L Lee
(74) *Attorney, Agent, or Firm* — Foley & Lardner LLP

(57) ABSTRACT

The present invention provides a rubber composition obtained by kneading a rubber component, a vulcanization accelerator, silica, and a compound represented by the following formula (I):

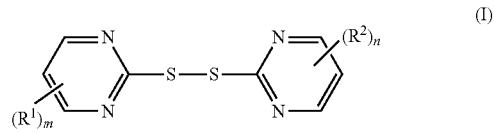

wherein the groups are as defined in the DESCRIPTION.

9 Claims, No Drawings

RUBBER COMPOSITION

CROSS-REFERENCE TO RELATED APPLICATIONS

The present application claims priority under 37 U.S.C. § 371 to International Patent Application No. PCT/JP2018/033196, filed Sep. 7, 2018, which claims priority to and the benefit of Japanese Patent Application No. 2017-176911, filed on Sep. 14, 2017, and Japanese Patent Application No. 2018-157683, filed on Aug. 24, 2018. The contents of these applications are hereby incorporated by reference in their entireties.

TECHNICAL FIELD

The present invention relates to a rubber composition and the like.

BACKGROUND ART

Low fuel consumption is one of the important performances of tires, and improvement thereof is desired. For example, patent document 1 describes that the low exothermic tendency of a rubber composition is improved by the use of disulfide compounds such as 4,4'-dipyridyl disulfide and the like, as a result of which, the low fuel consumption of the rubber composition is improved.

In addition, patent document 2 describes use of a pyrimidine derivative (particularly, 2,2-bis(4,6-dimethylpyrimidyl) disulfide) for achieving hardness stabilization of vulcanized rubber compositions (in detail, suppression of increase in hardness due to aging of vulcanized rubber composition).

DOCUMENT LIST

Patent Documents patent document 1: JP-A-2010-18716
patent document 2: JP-A-2004-500471

SUMMARY OF THE INVENTION

Problems to be Solved by the Invention

Abrasion resistance is also an important performance of tires like the aforementioned low fuel consumption. However, low fuel consumption and abrasion resistance are in a trade-off relationship where improving one reduces the other. The present invention has been made taking note of such situation, and aims to improve abrasion resistance of a vulcanized rubber composition without markedly impairing low fuel consumption (particularly, rolling resistance property) thereof.

Means of Solving the Problems

The present invention capable of achieving the above-mentioned object is as described below.

[1] A rubber composition obtained by kneading a rubber component, a vulcanization accelerator, silica, and a compound represented by the formula (I):

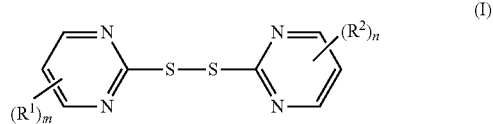

wherein m and n are each independently 0-3,
$R^1$ and $R^2$ are each independently a halogen atom, a $C_{1-18}$ alkyl group optionally having substituent(s), a $C_{3-10}$ cycloalkyl group optionally having substituent(s), a $C_{6-18}$ aryl group optionally having substituent(s), a $C_{7-20}$ aralkyl group optionally having substituent(s), a carboxy group, a $C_{1-18}$ alkoxy-carbonyl group optionally having substituent(s), a $C_{3-10}$ cycloalkyloxy-carbonyl group optionally having substituent(s), a $C_{6-18}$ aryloxy-carbonyl group optionally having substituent(s), a $C_{7-20}$ aralkyloxy-carbonyl group optionally having substituent(s), a carbamoyl group optionally having substituent(s), a hydroxy group, a $C_{1-18}$ alkoxy group optionally having substituent(s), a $C_{3-10}$ cycloalkyloxy group optionally having substituent(s), a $C_{6-18}$ aryloxy group optionally having substituent(s), a $C_{7-20}$ aralkyloxy group optionally having substituent(s), a $C_{1-18}$ alkyl-carbonyloxy group optionally having substituent(s), a $C_{3-10}$ cycloalkyl-carbonyloxy group optionally having substituent(s), a $C_{6-18}$ aryl-carbonyloxy group optionally having substituent(s), a $C_{7-20}$ aralkyl-carbonyloxy group optionally having substituent(s), an amino group optionally having substituent(s), or a nitro group, when m is 2 or 3, multiple $R^1$s may be the same or different, when n is 2 or 3, multiple $R^2$s may be the same or different.

[2] The rubber composition of the aforementioned [1], wherein $R^1$ and $R^2$ are each independently a $C_{1-18}$ alkyl group optionally having substituent(s), a hydroxy group, a $C_{1-18}$ alkoxy group optionally having substituent(s), a $C_{1-18}$ alkyl-carbonyloxy group optionally having substituent(s), an amino group, or a mono($C_{1-18}$ alkyl-carbonyl optionally having substituent(s))amino group, when m is 2 or 3, multiple $R^1$s may be the same or different, and when n is 2 or 3, multiple $R^2$s may be the same or different.

[3] The rubber composition of the aforementioned [1], wherein $R^1$ and $R^2$ are each independently a $C_{1-18}$ alkyl group, a hydroxy group, a $C_{1-18}$ alkoxy group, a $C_{1-18}$ alkyl-carbonyloxy group, an amino group, or a mono($C_{1-18}$ alkyl-carbonyl)amino group, when m is 2 or 3, multiple $R^1$s may be the same or different, and when n is 2 or 3, multiple $R^2$s may be the same or different.

[4] The rubber composition of the aforementioned [1], wherein $R^1$ and $R^2$ are each independently a $C_{1-6}$ alkyl group, when m is 2 or 3, multiple $R^1$s may be the same or different, and when n is 2 or 3, multiple $R^2$s may be the same or different.

[5] The rubber composition of any one of the aforementioned [1] to [4], wherein $R^1$ and $R^2$ are the same.

[6] The rubber composition of any one of the aforementioned [1] to [5], wherein m and n are each independently 0 or 2.

[7] The rubber composition of any one of the aforementioned [1] to [5], wherein the compound represented by the formula (I) is a compound represented by the formula (Ia) or the formula (Ib), or a compound represented by the formula (Ia) and a compound represented by the formula (Ib):

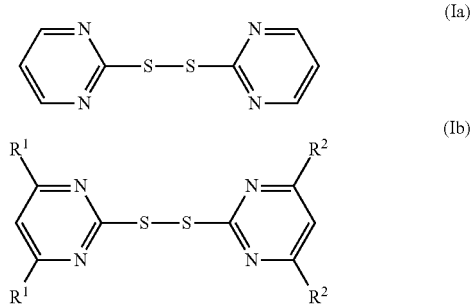

wherein R[1] and R[2] are as defined above.

[8] The rubber composition of any one of the aforementioned [1] to [7], wherein an amount of the compound represented by the formula (I) is 0.02-10 parts by weight based on 100 parts by weight of the rubber component.

[9] The rubber composition of any one of the aforementioned [1] to [7], wherein an amount of the compound represented by the formula (I) is 0.02-8 parts by weight based on 100 parts by weight of the rubber component.

[10] The rubber composition of any one of the aforementioned [1] to [7], wherein an amount of the compound represented by the formula (I) is 0.1-6 parts by weight based on 100 parts by weight of the rubber component.

[11] The rubber composition of any one of the aforementioned [1] to [7], wherein an amount of the compound represented by the formula (I) is 0.1-5 parts by weight based on 100 parts by weight of the rubber component.

[12] The rubber composition of any one of the aforementioned [1] to [11], wherein the rubber component comprises a diene rubber.

[13] The rubber composition of the aforementioned [12], wherein an amount of the diene rubber in the rubber component is 50-100 wt %.

[14] The rubber composition of the aforementioned [12], wherein an amount of the diene rubber in the rubber component is 70-100 wt %.

[15] The rubber composition of the aforementioned [12], wherein an amount of the diene rubber in the rubber component is 80-100 wt %.

[16] The rubber composition of the aforementioned [12], wherein the rubber component consists of a diene rubber.

[17] The rubber composition of any one of the aforementioned [1] to [11], wherein the rubber component comprises a styrene-butadiene copolymer rubber.

[18] The rubber composition of the aforementioned [17], wherein an amount of the styrene-butadiene copolymer rubber in the rubber component is 50-100 wt %.

[19] The rubber composition of the aforementioned [17], wherein an amount of the styrene-butadiene copolymer rubber in the rubber component is 70-100 wt %.

[20] The rubber composition of the aforementioned [17], wherein an amount of the styrene-butadiene copolymer rubber in the rubber component is 80-100 wt %.

[21] The rubber composition of the aforementioned [17], wherein the rubber component consists of a styrene-butadiene copolymer rubber.

[22] The rubber composition of any one of the aforementioned [1] to [11], wherein the rubber component comprises a styrene-butadiene copolymer rubber and a polybutadiene rubber.

[23] The rubber composition of the aforementioned [22], wherein a total amount of the styrene-butadiene copolymer rubber and the polybutadiene rubber in the rubber component is 50-100 wt %.

[24] The rubber composition of the aforementioned [22], wherein a total amount of the styrene-butadiene copolymer rubber and the polybutadiene rubber in the rubber component is 70-100 wt %.

[25] The rubber composition of the aforementioned [22], wherein a total amount of the styrene-butadiene copolymer rubber and the polybutadiene rubber in the rubber component is 80-100 wt %.

[26] The rubber composition of the aforementioned [22], wherein the rubber component consists of the styrene-butadiene copolymer rubber and the polybutadiene rubber.

[27] The rubber composition of any one of the aforementioned [22] to [26], wherein a weight ratio of the amount of the polybutadiene rubber and the amount of the styrene-butadiene copolymer rubber (polybutadiene rubber amount/styrene-butadiene copolymer rubber amount) is 5/95-50/50.

[28] The rubber composition of any one of the aforementioned [22] to [26], wherein a weight ratio of the amount of the polybutadiene rubber and the amount of the styrene-butadiene copolymer rubber (polybutadiene rubber amount/styrene-butadiene copolymer rubber amount) is 10/90-40/60.

[29] The rubber composition of any one of the aforementioned [22] to [26], wherein a weight ratio of the amount of the polybutadiene rubber and the amount of the styrene-butadiene copolymer rubber (polybutadiene rubber amount/styrene-butadiene copolymer rubber amount) is 20/80-40/60.

[30] The rubber composition of any one of the aforementioned [1] to [29], wherein an amount of the vulcanization accelerator is 0.5-10.5 parts by weight based on 100 parts by weight of the rubber component.

[31] The rubber composition of any one of the aforementioned [1] to [29], wherein an amount of the vulcanization accelerator is 0.7-8 parts by weight based on 100 parts by weight of the rubber component.

[32] The rubber composition of any one of the aforementioned [1] to [29], wherein an amount of the vulcanization accelerator is 0.8-6 parts by weight based on 100 parts by weight of the rubber component.

[33] The rubber composition of any one of the aforementioned [1] to [29], wherein an amount of the vulcanization accelerator is 0.8-5.5 parts by weight based on 100 parts by weight of the rubber component.

[34] The rubber composition of any one of the aforementioned [1] to [33], wherein the vulcanization accelerator comprises a sulfenamide vulcanization accelerator.

[35] The rubber composition of the aforementioned [34], wherein the sulfenamide vulcanization accelerator is at least one selected from the group consisting of N-cyclohexyl-2-benzothiazolylsulfenamide (CBS), N-tert-butyl-2-benzothiazolylsulfenamide (BBS), N-oxydiethylene-2-benzothiazolylsulfenamide (OBS), and N,N-dicyclohexyl-2-benzothiazolylsulfenamide (DCBS).

[36] The rubber composition of the aforementioned [34], wherein the sulfenamide vulcanization accelerator is N-cyclohexyl-2-benzothiazolylsulfenamide (CBS).

[37] The rubber composition of any one of the aforementioned [34] to [36], wherein an amount of the sulfenamide vulcanization accelerator is 0.1-10 parts by weight based on 100 parts by weight of the rubber component.

[38] The rubber composition of any one of the aforementioned [34] to [36], wherein an amount of the sulfenamide vulcanization accelerator is 0.1-7 parts by weight based on 100 parts by weight of the rubber component.

[39] The rubber composition of any one of the aforementioned [34] to [36], wherein an amount of the sulfenamide vulcanization accelerator is 0.1-5 parts by weight based on 100 parts by weight of the rubber component.

[40] The rubber composition of any one of the aforementioned [34] to [36], wherein an amount of the sulfenamide vulcanization accelerator is 1-5 parts by weight based on 100 parts by weight of the rubber component.

[41] The rubber composition of any one of the aforementioned [1] to [40], wherein a BET specific surface area of silica is 20-400 $m^2/g$.

[42] The rubber composition of any one of the aforementioned [1] to [40], wherein a BET specific surface area of silica is 20-350 $m^2/g$.

[43] The rubber composition of any one of the aforementioned [1] to [40], wherein a BET specific surface area of silica is 20-300 $m^2/g$.

[44] The rubber composition of any one of the aforementioned [1] to [43], wherein an amount of silica is 10-120 parts by weight based on 100 parts by weight of the rubber component.

[45] The rubber composition of any one of the aforementioned [1] to [43], wherein an amount of silica is 20-120 parts by weight based on 100 parts by weight of the rubber component.

[46] The rubber composition of any one of the aforementioned [1] to [43], wherein an amount of silica is 30-120 parts by weight based on 100 parts by weight of the rubber component.

[47] The rubber composition of any one of the aforementioned [1] to [43], wherein an amount of silica is 40-100 parts by weight based on 100 parts by weight of the rubber component.

[48] The rubber composition of any one of the aforementioned [1] to [43], wherein an amount of silica is 50-100 parts by weight based on 100 parts by weight of the rubber component.

[49] The rubber composition of any one of the aforementioned [1] to [48], wherein the rubber composition is obtained by further mixing and kneading carbon black.

[50] The rubber composition of the aforementioned [49], wherein the carbon black has a BET specific surface area of 10-130 $m^2/g$.

[51] The rubber composition of the aforementioned [49], wherein the carbon black has a BET specific surface area of 20-130 $m^2/g$.

[52] The rubber composition of the aforementioned [49], wherein the carbon black has a BET specific surface area of 40-130 $m^2/g$.

[53] The rubber composition of any one of the aforementioned [49] to [52], wherein an amount of the carbon black is 1-40 parts by weight based on 100 parts by weight of the rubber component.

[54] The rubber composition of any one of the aforementioned [49] to [52], wherein an amount of the carbon black is 1-30 parts by weight based on 100 parts by weight of the rubber component.

[55] The rubber composition of any one of the aforementioned [49] to [52], wherein an amount of the carbon black is 1-25 parts by weight based on 100 parts by weight of the rubber component.

[56] The rubber composition of any one of the aforementioned [49] to [55], wherein a weight ratio of the amount of the carbon black and the amount of the silica (carbon black amount/silica amount) is 1/120-3/4.

[57] The rubber composition of any one of the aforementioned [49] to [55], wherein a weight ratio of the amount of the carbon black and the amount of the silica (carbon black amount/silica amount) is 1/100-1/2.

[58] The rubber composition of any one of the aforementioned [49] to [55], wherein a weight ratio of the amount of the carbon black and the amount of the silica (carbon black amount/silica amount) is 1/100-5/12.

[59] The rubber composition of any one of the aforementioned [1] to [58], wherein the rubber composition is obtained by further mixing and kneading a sulfur component.

[60] The rubber composition of the aforementioned [59], wherein an amount of the sulfur component is 0.1-5 parts by weight based on 100 parts by weight of the rubber component.

[61] The rubber composition of the aforementioned [59], wherein an amount of the sulfur component is 0.1-3 parts by weight based on 100 parts by weight of the rubber component.

[62] The rubber composition of the aforementioned [59], wherein an amount of the sulfur component is 0.1-2 parts by weight based on 100 parts by weight of the rubber component.

[63] The rubber composition of any one of the aforementioned [59] to [62], wherein a weight ratio of the amount of the sulfur component and the amount of the vulcanization accelerator (sulfur component amount/vulcanization accelerator amount) is 1/10-10/1.

[64] The rubber composition of any one of the aforementioned [59] to [62], wherein a weight ratio of the amount of the sulfur component and the amount of the vulcanization accelerator (sulfur component amount/vulcanization accelerator amount) is 1/5-5/1.

[65] A vulcanized rubber composition obtained by vulcanizing the rubber composition of any one of the aforementioned [59] to [64].

[66] A tire comprising the vulcanized rubber composition of the aforementioned [65].

[67] Use of a compound represented by the formula (I):

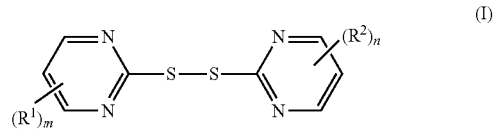

wherein m and n are each independently 0-3, $R^1$ and $R^2$ are each independently a halogen atom, a $C_{1-18}$ alkyl group optionally having substituent(s), a $C_{3-10}$ cycloalkyl group optionally having substituent(s), a $C_{6-18}$ aryl group optionally having substituent(s), a $C_{7-20}$ aralkyl group optionally having substituent(s), a carboxy group, a $C_{1-18}$ alkoxy-carbonyl group optionally having substituent(s), a $C_{3-10}$ cycloalkyloxy-carbonyl group optionally having substituent(s), a $C_{6-18}$ aryloxy-carbonyl group optionally having substituent(s), a $C_{7-20}$ aralkyloxy-carbonyl group optionally having substituent(s), a carbamoyl group optionally having substituent(s), a hydroxy group, a $C_{1-18}$ alkoxy group optionally having substituent(s), a $C_{3-10}$ cycloalkyloxy group optionally having substituent(s), a $C_{6-18}$ aryloxy group optionally having substituent(s), a $C_{7-20}$ aralkyloxy group optionally having substituent(s), a $C_{1-18}$ alkyl-carbonyloxy group optionally having substituent(s), a $C_{3-10}$ cycloalkyl-carbonyloxy group optionally having substituent(s), a $C_{6-18}$ aryl-carbonyloxy group optionally having substituent(s), a $C_{7-20}$ aralkyl-carbonyloxy group optionally having substituent(s), an amino group optionally having substituent(s), or a nitro group, when m is 2 or 3, multiple R¹s may be the same or different, when n is 2 or 3, multiple R²s may be the same or different, for improving abrasion resistance of a vulcanized rubber composition containing silica.

[68] The use of the aforementioned [67], wherein $R^1$ and $R^2$ are each independently a $C_{1-18}$ alkyl group optionally having substituent(s), a hydroxy group, a $C_{1-18}$ alkoxy group optionally having substituent(s), a $C_{1-18}$ alkyl-carbonyloxy group optionally having substituent(s), an amino group, or a mono($C_{1-18}$ alkyl-carbonyl optionally having substituent(s)) amino group, when m is 2 or 3, multiple R¹s may be the same or different, and when n is 2 or 3, multiple R²s may be the same or different.

[69] The use of the aforementioned [67], wherein $R^1$ and $R^2$ are each independently a $C_{1-18}$ alkyl group, a hydroxy group, a $C_{1-18}$ alkoxy group, a $C_{1-18}$ alkyl-carbonyloxy group, an amino group, or a mono($C_{1-18}$ alkyl-carbonyl)amino group, when m is 2 or 3, multiple R¹s may be the same or different, and when n is 2 or 3, multiple R²s may be the same or different.

[70] The use of the aforementioned [67], wherein $R^1$ and $R^2$ are each independently a $C_{1-6}$ alkyl group, when m is 2 or 3, multiple R¹s may be the same or different, and when n is 2 or 3, multiple R²s may be the same or different.

[71] The use of any one of the aforementioned [67] to [70], wherein $R^1$ and $R^2$ are the same.

[72] The use of any one of the aforementioned [67] to [71], wherein m and n are each independently 0 or 2.

[73] The use of any one of the aforementioned [67] to [71], wherein the compound represented by the formula (I) is a compound represented by the formula (Ia) or the formula (Ib):

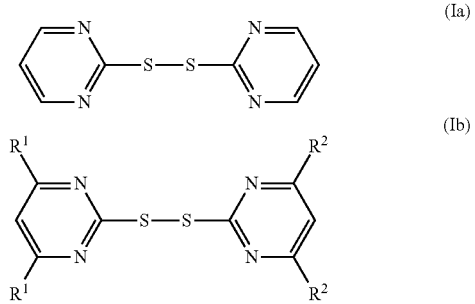

wherein $R^1$ and $R^2$ are as defined above, or a compound represented by the formula (Ia) and a compound represented by the formula (Ib).

Effect of the Invention

According to the present invention, abrasion resistance of a vulcanized rubber composition can be improved without markedly impairing the low fuel consumption (particularly, rolling resistance property).

DESCRIPTION OF EMBODIMENTS

The present invention is sequentially explained in the following. In the following "a compound represented by the formula (I) is sometimes to be abbreviated as "compound (I)". The compounds represented by other formulas are sometimes abbreviated in the same manner.

The present invention provides the following:
(1) a rubber composition obtained by kneading a rubber component, a vulcanization accelerator, silica, compound (I) and other components as necessary,
(2) a rubber composition obtained by kneading a rubber component, a vulcanization accelerator, silica, compound (I), a sulfur component and other components as necessary,
(3) a vulcanized rubber composition obtained by vulcanizing the rubber composition of the aforementioned (2),
(4) a tire containing the vulcanized rubber composition of the aforementioned (3),
(5) use of compound (I) for improving abrasion resistance of a vulcanized rubber composition containing silica.

There is a possibility that compound (I) may react with a rubber component and/or other components (e.g., silica, carbon black) during kneading to form a compound with them. However, it is impossible or impractical for the current technique to directly specify the compound possibly formed by the structure or property thereof since it is contained in the rubber composition which is a solid. Therefore, the rubber composition of the present invention is specified as "a rubber composition obtained by kneading a rubber component and compound (I)" in the present specification and claims. The same also applies to when a sulfur component and other components mentioned below are used.

Definition

First, the definitions of respective substituents and the like used in the present specification are sequentially explained.

The "$C_{x-y}$" means a carbon number not less than x and not more than y (x and y are numbers).

Examples of the halogen atom include fluorine atom, chlorine atom, bromine atom, and iodine atom.

The alkyl group may be a linear or branched chain. The carbon number of the alkyl group is, for example, 1 to 18. Examples of the alkyl group include methyl group, ethyl group, propyl group, isopropyl group, butyl group, isobutyl group, sec-butyl group, tert-butyl group, pentyl group, isopentyl group, neopentyl group, 1-ethylpropyl group, hexyl group, isohexyl group, 1,1-dimethylbutyl group, 2,2-dimethylbutyl group, 3,3-dimethylbutyl group, 2-ethylbutyl group, heptyl group, octyl group, nonyl group, decyl group, undecyl group, dodecyl group, tridecyl group, tetradecyl group, pentadecyl group, hexadecyl group, heptadecyl group, and octadecyl group.

The alkyl group optionally has substituent(s). Other groups (e.g., alkoxy group) having an alkyl group as a part thereof may similarly have substituent(s). Examples of the substituent that the alkyl group (e.g., $C_{1-18}$ alkyl group) and other groups having an alkyl group (e.g., $C_{1-18}$ alkyl group) as a part thereof may have include the following:
(1) halogen atom,
(2) cycloalkyl group (preferably $C_{3-8}$ cycloalkyl group),
(3) alkoxy group (preferably $C_{1-6}$ alkoxy group),
(4) cycloalkyloxy group (preferably $C_{3-8}$ cycloalkyloxy group),
(5) aryloxy group (preferably $C_{6-14}$ aryloxy group),
(6) aralkyloxy group (preferably $C_{7-16}$ aralkyloxy group),
(7) amino group optionally having substituent(s).

The carbon number of the cycloalkyl group is, for example, 3 to 10. Examples of the cycloalkyl group include cyclopropyl group, cyclobutyl group, cyclopentyl group, cyclohexyl group, cycloheptyl group, cyclooctyl group, bicyclo[2.2.1]heptyl group, bicyclo[2.2.2]octyl group, bicyclo[3.2.1]octyl group, and adamantyl group.

The carbon number of the aryl group is, for example, 6 to 18. Examples of the aryl group include phenyl group, 1-naphthyl group, 2-naphthyl group, 1-anthryl group, 2-anthryl group, and 9-anthryl group.

The carbon number of the aralkyl group is, for example, 7 to 20. Examples of the aralkyl group include benzyl group, phenethyl group, naphthylmethyl group, and phenylpropyl group.

The cycloalkyl group, aryl group and aralkyl group each optionally have substituent(s). Other groups (e.g., cycloalkyloxy group etc.) having a cycloalkyl group and the like as a part thereof may also have substituent(s). Examples of the substituent that the cycloalkyl group (e.g., $C_{3-10}$ cycloalkyl group), aryl group (e.g., $C_{6-18}$ aryl group) and aralkyl group (e.g., $C_{7-20}$ aralkyl group), and other groups having these groups as a part thereof may have include the following:
(1) halogen atom,
(2) alkyl group (preferably $C_{1-6}$ alkyl group),
(3) cycloalkyl group (preferably $C_{3-8}$ cycloalkyl group),
(4) an aryl group (preferably $C_{6-14}$ aryl group),
(5) aralkyl group (preferably $C_{7-16}$ aralkyl group),
(6) alkoxy group (preferably $C_{1-6}$ alkoxy group),
(7) cycloalkyloxy group (preferably $C_{3-8}$ cycloalkyloxy group),
(8) aryloxy group (preferably $C_{6-14}$ aryloxy group),
(9) aralkyloxy group (preferably $C_{7-16}$ aralkyloxy group),
(10) amino group optionally having substituent(s).

Explanation of the alkyl group which is a part of the alkoxy group (i.e., alkyloxy group) is as mentioned above. Explanation of the alkyl group which is a part of the below-mentioned groups is also the same. Examples of the alkoxy group include methoxy group, ethoxy group, propoxy group, isopropoxy group, butoxy group, isobutoxy group, sec-butoxy group, tert-butoxy group, pentyloxy group, and hexyloxy group.

Explanation of the cycloalkyl group which is a part of the cycloalkyloxy group is as mentioned above. Explanation of the cycloalkyl group which is a part of the below-mentioned groups is also the same. Examples of the cycloalkyloxy group include cyclopropyloxy group, cyclobutyloxy group, cyclopentyloxy group, cyclohexyloxy group, cycloheptyloxy group, and cyclooctyloxy group.

Explanation of the aryl group which is a part of the aryloxy group is as mentioned above. Explanation of the aryl group which is a part of the below-mentioned groups is also the same. Examples of the aryloxy group include phenyloxy group, 1-naphthyloxy group, and 2-naphthyloxy group.

Explanation of the aralkyl group which is a part of the aralkyloxy group is as mentioned above. Explanation of the aralkyl group which is a part of the below-mentioned groups is also the same. Examples of the aralkyloxy group include benzyloxy group, phenethyloxy group, naphthylmethyloxy group, and phenylpropyloxy group.

Examples of the alkyl-carbonyloxy group include acetyloxy group, propanoyloxy group, butanoyloxy group, 2-methylpropanoyloxy group, pentanoyloxy group, 3-methylbutanoyloxy group, 2-methylbutanoyloxy group, 2,2-dimethylpropanoyloxy group, hexanoyloxy group, and heptanoyloxy group. The indication of a "$C_{1-18}$ alkyl-carbonyloxy group" shows that the carbon number of the alkyl group which is a part of this group is 1 to 18. Other indications mean the same.

Examples of the cycloalkyl-carbonyloxy group include cyclopropyl-carbonyloxy group, cyclobutyl-carbonyloxy group, cyclopentyl-carbonyloxy group, cyclohexyl-carbonyloxy group, cycloheptyl-carbonyloxy group, and cyclooctyl-carbonyloxy group.

Examples of the aryl-carbonyloxy group include benzoyloxy group, 1-naphthoyloxy group, and 2-naphthoyloxy group.

Examples of the aralkyl-carbonyloxy group include phenylacetyloxy group, and phenylpropionyloxy group.

Examples of the alkoxy-carbonyl group include methoxycarbonyl group, ethoxycarbonyl group, propoxycarbonyl group, isopropoxycarbonyl group, butoxycarbonyl group, isobutoxycarbonyl group, sec-butoxycarbonyl group, tert-butoxycarbonyl group, pentyloxycarbonyl group, and hexyloxycarbonyl group.

Examples of the cycloalkyloxy-carbonyl group include cyclopropyloxycarbonyl group, cyclobutyloxycarbonyl group, cyclopentyloxycarbonyl group, cyclohexyloxycarbonyl group, cycloheptyloxycarbonyl group, and cyclooctyloxycarbonyl group.

Examples of the aryloxy-carbonyl group include phenyloxycarbonyl group, 1-naphthyloxycarbonyl group, and 2-naphthyloxycarbonyl group.

Examples of the aralkyloxy-carbonyl group include benzyloxycarbonyl group, phenethyloxycarbonyl group, naphthylmethyloxycarbonyl group, and phenylpropyloxycarbonyl group.

Examples of the carbamoyl group optionally having substituent(s) include a carbamoyl group optionally having 1 or 2 substituents selected from an alkyl group optionally having substituent(s), a cycloalkyl group optionally having substituent(s), an aryl group optionally having substituent(s), and an aralkyl group optionally having substituent(s).

Preferable examples of the carbamoyl group optionally having substituent(s) include the following:
(1) carbamoyl group,
(2) mono- or di-(alkyl optionally having substituent(s)) carbamoyl group (e.g., methylcarbamoyl group, ethylcarbamoyl group, dimethylcarbamoyl group, diethylcarbamoyl group, N-ethyl-N-methylcarbamoyl group),
(3) mono- or di-(cycloalkyl optionally having substituent(s))carbamoyl group (e.g., cyclopropylcarbamoyl group, cyclohexylcarbamoyl group),
(4) mono- or di-(aryl optionally having substituent(s))carbamoyl group (e.g., phenylcarbamoyl group),
(5) mono- or di-(aralkyl optionally having substituent(s)) carbamoyl group (e.g., benzylcarbamoyl group, phenethylcarbamoyl group).

As used herein, the "mono- or di-(alkyl optionally having substituent(s))carbamoyl group" is a mono(alkyl optionally having substituent(s))carbamoyl group or di(alkyl optionally having substituent(s))carbamoyl group. The same meaning applies to other similar expressions. In addition, the "mono(alkyl optionally having substituent(s))carbamoyl group" is a carbamoyl group having one alkyl group optionally having substituent(s) as the substituent. The same meaning applies to other similar expressions.

Examples of the amino group optionally having substituent(s) include an amino group optionally having 1 or 2 substituents selected from an alkyl group optionally having substituent(s), a cycloalkyl group optionally having substituent(s), an aryl group optionally having substituent(s), an aralkyl group optionally having substituent(s), an alkyl-carbonyl group optionally having substituent(s), a cycloalkyl-carbonyl group optionally having substituent(s), an aryl-carbonyl group optionally having substituent(s), and an aralkyl-carbonyl group optionally having substituent(s).

Preferable examples of the amino group optionally having substituent(s) include the following:
(1) amino group,
(2) mono- or di-(alkyl optionally having substituent(s))amino group (e.g., methylamino group, trifluoromethylamino group, dimethylamino group, ethylamino group, diethylamino group, propylamino group, dibutylamino group),
(3) mono- or di-(cycloalkyl optionally having substituent(s))amino group (e.g., cyclopropylamino group, cyclohexylamino group),
(4) mono- or di-(aryl optionally having substituent(s))amino group (e.g., phenylamino group),
(5) mono- or di-(aralkyl optionally having substituent(s))amino group (e.g., benzylamino group, dibenzylamino group),
(6) mono- or di-(alkyl-carbonyl optionally having substituent(s))amino group (e.g., acetylamino group, propionylamino group),
(7) mono- or di-(cycloalkyl-carbonyl optionally having substituent(s))amino group (e.g., cyclopropylcarbonylamino group, cyclohexylcarbonylamino group),
(8) mono- or di-(aryl-carbonyl optionally having substituent(s))amino group (e.g., benzoylamino group),
(9) mono- or di-(aralkyl-carbonyl optionally having substituent(s))amino group (e.g., benzylcarbonylamino group).

As used herein, the "mono- or di-(alkyl optionally having substituent(s))amino group" is a mono(alkyl optionally having substituent(s))amino group or di(alkyl optionally having substituent(s))amino group. The same meaning applies to other similar expressions. In addition, the "mono(alkyl optionally having substituent(s))amino group" is an amino group having one alkyl group optionally having substituent(s) as the substituent. The same meaning applies to other similar expressions.

<Compound Represented by the Formula (I)>

One of the characteristics of the present invention is the use of a compound represented by the formula (I):

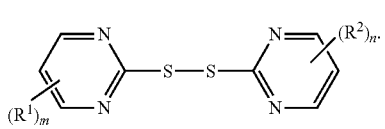

Only one kind of compound (I) may be used or two or more kinds thereof may be used.

In the formula (I), m and n are each independently 0-3. When m is two or more, multiple $R^1$s may be the same or different, and when n is two or more, multiple $R^2$s may be the same or different. Multiple $R^1$s are preferably the same. In addition, multiple $R^2$s are preferably the same. m and n are each independently preferably 0-2, more preferably 0 or 2.

In the formula (I), $R^1$ and $R^2$ are each independently a halogen atom, a $C_{1-18}$ alkyl group optionally having substituent(s), a $C_{3-10}$ cycloalkyl group optionally having substituent(s), a $C_{6-18}$ aryl group optionally having substituent(s), a $C_{7-20}$ aralkyl group optionally having substituent(s), a carboxy group, a $C_{1-18}$ alkoxy-carbonyl group optionally having substituent(s), a $C_{3-10}$ cycloalkyloxy-carbonyl group optionally having substituent(s), a $C_{6-18}$ aryloxy-carbonyl group optionally having substituent(s), a $C_{7-20}$ aralkyloxy-carbonyl group optionally having substituent(s), a carbamoyl group optionally having substituent(s), a hydroxy group, a $C_{1-18}$ alkoxy group optionally having substituent(s), a $C_{3-10}$ cycloalkyloxy group optionally having substituent(s), a $C_{6-16}$ aryloxy group optionally having substituent(s), a $C_{7-20}$ aralkyloxy group optionally having substituent(s), a $C_{1-18}$ alkyl-carbonyloxy group optionally having substituent(s), a $C_{3-10}$ cycloalkyl-carbonyloxy group optionally having substituent(s), a $C_{6-18}$ aryl-carbonyloxy group optionally having substituent(s), a $C_{7-20}$ aralkyl-carbonyloxy group optionally having substituent(s), an amino group optionally having substituent(s), or a nitro group. $R^1$ and $R^2$ are preferably the same.

$R^1$ and $R^2$ are each independently preferably a $C_{1-18}$ alkyl group optionally having substituent(s), a hydroxy group, a $C_{1-18}$ alkoxy group optionally having substituent(s), a $C_{1-18}$ alkyl-carbonyloxy group optionally having substituent(s), an amino group, or a mono($C_{1-18}$ alkyl-carbonyl optionally having substituent(s))amino group, more preferably a $C_{1-18}$ alkyl group, a hydroxy group, a $C_{1-18}$ alkoxy group, a $C_{1-18}$ alkyl-carbonyloxy group, an amino group, or a mono($C_{1-18}$ alkyl-carbonyl)amino group, further preferably a $C_{1-6}$ alkyl group. $R^1$ and $R^2$ are preferably the same.

Among compounds (I), from the aspects of low fuel consumption and abrasion resistance, a compound represented by the following formula (Ia) (i.e., 2,2'-dipyrimidyl disulfide) and a compound represented by the following formula (Ib) are preferable ($R^1$ and $R^2$ in the following formula (Ib) are as defined above):

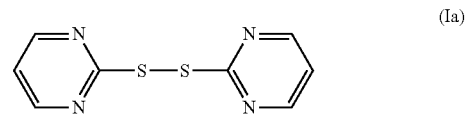

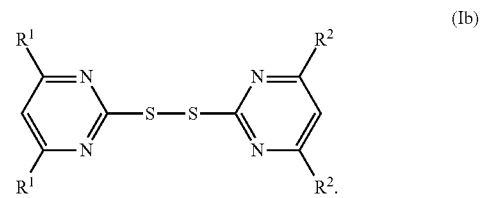

The amount of compound (I) (when two or more kinds of compounds (I) are used, a total amount thereof) is, from the aspects of low fuel consumption and abrasion resistance, preferably 0.02-10 parts by weight, more preferably 0.02-8 parts by weight, further preferably 0.1-6 parts by weight, particularly preferably 0.1-5 parts by weight, based on 100 parts by weight of the rubber component.

Compound (I) can be produced according to a known method. Compound (I) can be produced, for example, by step (1) shown below (the groups in the following formula are as defined above):

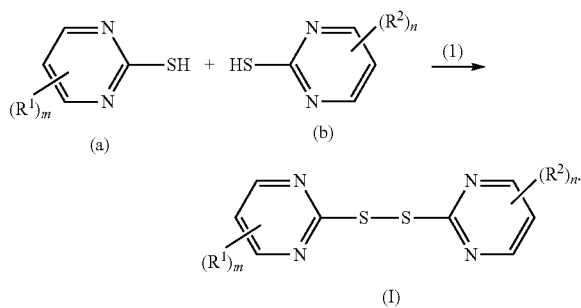

Step (1) is directed to the oxidation of compound (a) and compound (b) and formation of a disulfide bond. The oxidation can be performed using an oxidant such as hydrogen peroxide, potassium ferricyanide, oxygen, iodine, bromine, iodobenzene diacetate, sodium periodate, potassium permanganate or the like. Only one kind of oxidant may be used or two or more kinds thereof may be used. In addition, iodine may be generated in the system by the use of hydrogen peroxide and sodium iodide in combination. The amount of the oxidant to be used (when two or more kinds of oxidants are used, a total amount thereof) is preferably 1-10 mol, more preferably 1-3 mol, per 1 mol of the total of compound (a) and compound (b).

The reaction of step (1) (i.e., oxidation and formation of disulfide bond) is generally performed in a solvent. Examples of the solvent include ester solvents such as ethyl acetate, methyl acetate, butyl acetate, propyl acetate, isopropyl acetate, ethyl lactate and the like, amide solvents such as N,N-dimethylformamide, N,N-dimethylacetamide, N-methyl-2-pyrrolidone and the like, sulfoxide solvents such as dimethyl sulfoxide and the like, aromatic hydrocarbon solvents such as benzene, toluene, xylene and the like, ether solvents such as tetrahydrofuran, 1,4-dioxane, methyl ethyl ether and the like, and protonic solvents such as water, methanol, ethanol and the like. Only one kind of solvent may be used or two or more kinds thereof may be used.

The reaction of step (1) (i.e., oxidation and formation of disulfide bond) is preferably performed by adding an aqueous hydrogen peroxide solution to compound (a) and compound (b). Oxidation and formation of a disulfide bond using an aqueous hydrogen peroxide solution are exothermic reactions. After addition of the aqueous hydrogen peroxide solution, the mixture is preferably stirred at 0-100° C., more preferably 0-60° C., for preferably 0.1-48 hr, more preferably 0.1-24 hr.

After the reaction of step (1), compound (I) can be obtained by a known means (filtration, extraction, concentration etc.). The obtained compound (I) may be purified by a known means.

<Rubber Component>

Examples of the rubber component include styrene-butadiene copolymer rubber (SBR), natural rubber (NR) (including modified natural rubber, for example, epoxydized natural rubber, deproteinized natural rubber), polybutadiene rubber (BR), polyisoprene rubber (IR), nitrile rubber (NBR), chloroprene rubber (CR), isoprene-isobutylene copolymer rubber (IIR), ethylene-propylene-diene copolymer rubber (EPDM), halogenated butyl rubber (HR) and the like. Only one kind of the rubber component may be used, or two or more kinds thereof may be used in combination.

Examples of the SBR include emulsion-polymerized SBR and solution-polymerized SBR described in "GOMU KOGYO BINRAN (Rubber Industry Handbook) <fourth edition>" pp. 210-211 edited by The Society of Rubber Science and Technology, Japan. Emulsion-polymerized SBR and solution-polymerized SBR may be used in combination.

Examples of the solution-polymerized SBR include modified solution-polymerized SBR having at least one element of nitrogen, tin and silicon on the molecular terminal, which is obtained by modifying with a modifying agent. Examples of the modifying agent include lactam compound, amide compound, urea compound, N,N-dialkylacrylamide compound, isocyanate compound, imide compound, silane compound having alkoxy group, aminosilane compound, combined modifying agent of tin compound and silane compound having alkoxy group, combined modifying agent of alkylacrylamide compound and silane compound having alkoxy group, and the like. The modifying agent may be used alone, or a plurality thereof may also be used. Specific examples of the modified solution-polymerized SBR include solution-polymerized SBR having molecular terminal modified with 4,4'-bis(dialkylamino)benzophenone such as "Nipol (registered trade mark) NS116" manufactured by Zeon Corporation, solution-polymerized SBR having molecular terminal modified with a halogenated tin compound such as "SL574" manufactured by JSR, silane modified solution-polymerized SBR such as "E10" and "E15" manufactured by Asahi Kasei Corporation, and the like.

In addition, oil-extended SBR obtained by adding oil such as process oil, aroma oil and the like to emulsion-polymerized SBR and solution-polymerized SBR can also be used.

Examples of the natural rubber include natural rubber with grades such as RSS #1, RSS #3, TSR20, SIR20 and the like. Examples of the epoxydized natural rubber include those with a degree of epoxidization of 10-60 mol % (e.g., ENR25 and ENR50 manufactured by Kumpulan Guthrie). As the deproteinized natural rubber, deproteinized natural rubber having a total nitrogen content of not more than 0.3 wt % is preferable. Examples of the other modified natural rubber include modified natural rubber containing a polar group obtained by reacting natural rubber with 4-vinylpyridine, N,N,-dialkylaminoethyl acrylate (e.g., N,N,-diethylaminoethyl acrylate), 2-hydroxy acrylate and the like.

As BR, BR typically used in tire industry can be used. BR is often used as a blend with SBR and/or natural rubber.

As BR, a BR with a high cis content is preferred since abrasion resistance-improving effect is high, and a high-cis BR with a cis content of not less than 95 mass % is more preferred. Examples of the high-cis BR include BR1220 manufactured by Zeon Corporation, BR150B manufactured by Ube Industries, Ltd., and the like.

A modified BR having at least one element of nitrogen, tin and silicon on the molecular terminal, which is obtained by modifying with a modifying agent can also be used. Examples of the modifying agent include 4,4'-bis(dialkylamino)benzophenone, halogenated tin compound, lactam compound, amide compound, urea compound, N,N-dialkylacrylamide compound, isocyanate compound, imide compound, silane compound having an alkoxy group (e.g., trialkoxysilane compound), aminosilane compound, tin compound, alkylacrylamide compound and the like. The modifying agent may be used alone, or a plurality thereof may also be used. Examples of the modified BR include tin-modified BR such as "Nipol (registered trade mark) BR 1250H" manufactured by Zeon Corporation and the like.

The rubber component preferably contains a diene rubber. As used herein, the diene rubber means a rubber using a diene monomer having a conjugated double bond as a starting material. Examples of the diene rubber include styrene-butadiene copolymer rubber (SBR), natural rubber (NR), polybutadiene rubber (BR), polyisoprene rubber (IR), nitrile rubber (NBR), chloroprene rubber (CR) and the like.

When a diene rubber is used, the amount of the diene rubber in the rubber component (i.e., amount of diene rubber based on 100 wt % rubber component) is preferably 50-100 wt %, more preferably 70-100 wt %, further preferably 80-100 wt %, most preferably 100 wt %. That is, the rubber component most preferably consists of a diene rubber.

In one embodiment of the present invention, the rubber component preferably contains SBR. The amount of SBR in the rubber component in this embodiment is preferably 50-100 wt %, more preferably 70-100 wt %, further preferably 80-100 wt %, most preferably 100 wt %. That is, the rubber component most preferably consists of SBR in this embodiment.

In one embodiment of the present invention, the rubber component preferably contains SBR and BR. In this embodiment, the total amount of SBR and BR in the rubber component is preferably 50-100 wt %, more preferably 70-100 wt %, further preferably 80-100 wt %, most preferably 100 wt %. That is, the rubber component most preferably consists of SBR and BR in this embodiment. The weight ratio of the amount of BR and the amount of SBR (BR amount/SBR amount) in this embodiment is preferably 5/95-50/50, more preferably 10/90-40/60, further preferably 20/80-40/60, from the aspects of low fuel consumption and abrasion resistance.

<Vulcanization Accelerator>

As the vulcanization accelerator, one described in GOMU KOGYO BINRAN (Rubber Industry Handbook) <fourth edition> (published by The Society of Rubber Science and Technology, Japan on Jan. 20, 1994) can be used. Only one kind of vulcanization accelerator may be used or two or more kinds thereof may be used. Examples of the vulcanization accelerator include sulfenamide vulcanization accelerator, thiazole vulcanization accelerator, guanidine vulcanization accelerator and the like.

Examples of the sulfenamide vulcanization accelerator include N-cyclohexyl-2-benzothiazolylsulfenamide (CBS), N-tert-butyl-2-benzothiazolylsulfenamide (BBS), N-oxydiethylene-2-benzothiazolylsulfenamide (OBS), N,N-dicyclohexyl-2-benzothiazolylsulfenamide (DCBS) and the like. Only one kind of sulfenamide vulcanization accelerator may be used or two or more kinds thereof may be used.

Examples of the thiazole vulcanization accelerator include 2-mercaptobenzothiazole (MBT), dibenzothiazyl disulfide (METS), 2-mercaptobenzothiazole cyclohexylamine salt (CMBT), 2-mercaptobenzothiazole zinc salt (ZMBT) and the like. Only one kind of thiazole vulcanization accelerator may be used or two or more kinds thereof may be used.

Examples of the guanidine vulcanization accelerator include diphenylguanidine (DPG), N,N'-di-o-tolylguanidine (DOTG) and the like. Only one kind of guanidine vulcanization accelerator may be used or two or more kinds thereof may be used.

The amount of the vulcanization accelerator (when two or more kinds of vulcanization accelerators are used, a total amount thereof) is preferably 0.5-10.5 parts by weight, more preferably 0.7-8 parts by weight, further preferably 0.8-6 parts by weight, particularly preferably 0.8-5.5 parts by weight, based on 100 parts by weight of the rubber component.

The vulcanization accelerator preferably contains a sulfenamide vulcanization accelerator. The sulfenamide vulcanization accelerator is preferably at least one selected from the group consisting of N-cyclohexyl-2-benzothiazolylsulfenamide (CBS), N-tert-butyl-2-benzothiazolylsulfenamide (BBS), N-oxydiethylene-2-benzothiazolylsulfenamide (OBS), and N,N-dicyclohexyl-2-benzothiazolylsulfenamide (DCBS), more preferably N-cyclohexyl-2-benzothiazolylsulfenamide (CBS).

When a sulfenamide vulcanization accelerator is used, the amount thereof (when two or more kinds of sulfenamide vulcanization accelerators are used, a total amount thereof) is preferably 0.1-10 parts by weight, more preferably 0.1-7 parts by weight, further preferably 0.1-5 parts by weight, particularly preferably 1-5 parts by weight, based on 100 parts by weight of the rubber component.

While a weight ratio of the amount of the sulfur component and the amount of the vulcanization accelerator (sulfur component amount/vulcanization accelerator amount) is not particularly limited, it is preferably 1/10-10/1, more preferably 1/5-5/1. When two or more kinds of vulcanization accelerators (e.g., CBS and DPG) are used, the aforementioned weight ratio is calculated using the amount of the sulfur component and the total amount of two or more kinds of vulcanization accelerators.

<Filler>

In the present invention, silica is characteristically used as a filler.

The BET specific surface area of silica is preferably 20-400 $m^2/g$, more preferably 20-350 $m^2/g$, further preferably 20-300 $m^2/g$. The BET specific surface area can be measured by the multipoint nitrogen adsorption method (BET method).

Examples of the silica include (i) silica having pH 6-8, (ii) silica containing 0.2-1.5 wt % of sodium, (iii) spherical silica with a circularity of 1-1.3, (iv) silica surface-treated by silicone oil (e.g., dimethylsilicone oil), organic silicon compound containing ethoxysilyl group, alcohol (e.g., ethanol, polyethylene glycol) and the like, (v) a mixture of two or more kinds of silica having different surface areas and the like. Only one kind of these may be used, or two or more kinds thereof may be used in combination.

Examples of a commercially available product of silica include "Nipsil (registered trade mark) AQ", "Nipsil (registered trade mark) AQ-N" manufactured by Tosoh Silica Corporation, "Ultrasil (registered trade mark) VN3", "Ultrasil (registered trade mark) VN3-G", "Ultrasil (registered trade mark) 360", "Ultrasil (registered trade mark) 7000", "Ultrasil (registered trade mark) 9100GR" manufactured by EVONIK, "Zeosil (registered trade mark) 115GR", "Zeosil (registered trade mark) 1115MP", "Zeosil (registered trade mark) 1205MP", and "Zeosil (registered trade mark) Z85MP" manufactured by Solvay.

The amount of silica is preferably 10-120 parts by weight, more preferably 20-120 parts by weight, further preferably 30-120 parts by weight, particularly preferably 40-100 parts by weight, most preferably 50-100 parts by weight, based on 100 parts by weight of the rubber component, from the aspects of low fuel consumption and abrasion resistance.

In the present invention, carbon black may also be used as a filler.

The BET specific surface area of carbon black is preferably 10-130 $m^2/g$, more preferably 20-130 $m^2/g$, further preferably 40-130 $m^2/g$. The BET specific surface area can be measured by the multipoint nitrogen adsorption method (BET method).

Examples of carbon black include those described in "GOMU KOGYO BINRAN (Rubber Industry Handbook) <fourth edition>", p. 494, edited by The Society of Rubber Science and Technology, Japan. Only one kind of carbon black may be used, or two or more kinds thereof may be used in combination. As carbon black, HAF (High Abrasion Furnace), SAF (Super Abrasion Furnace), ISAF (Intermediate SAF), ISAF-HM (Intermediate SAF-High Modulus), FEF (Fast Extrusion Furnace), MAF (Medium Abrasion Furnace), GPF (General Purpose Furnace), and SRF (Semi-Reinforcing Furnace) are preferred.

When carbon black is used, the amount thereof is preferably 1-40 parts by weight, more preferably 1-30 parts by weight, further preferably 1-25 parts by weight, based on 100 parts by weight of the rubber component, from the aspects of low fuel consumption, abrasion resistance and reinforcing performance.

When carbon black is used, the weight ratio of the amount of carbon black and the amount of silica (carbon black amount/silica amount) is preferably 1/120-3/4, more preferably 1/100-1/2, further preferably 1/100-5/12, from the aspects of low fuel consumption and abrasion resistance.

In the present invention, other filler different from silica and carbon black may be used. Examples of other filler include aluminum hydroxide, ground bituminous coal, talc, clay (particularly, calcined clay), titanium oxide.

Examples of aluminum hydroxide include aluminum hydroxide having a nitrogen adsorption specific surface area of 5-250 m$^2$/g and a DOP oil absorption of 50-100 ml/100 g.

The average particle size of the ground bituminous coal is preferably not less than 0.001 mm, preferably not more than 0.1 mm, more preferably not more than 0.05 mm, further preferably not more than 0.01 mm. The average particle size of the ground bituminous coal is a mass standard average particle size calculated from the particle size distribution measured according to JIS Z 8815-1994.

The specific gravity of the ground bituminous coal is preferably not more than 1.6, more preferably not more than 1.5, further preferably not more than 1.3. When ground bituminous coal having a specific gravity exceeding 1.6 is used, the specific gravity of the whole rubber composition may increase, and improvement of low fuel consumption of tire may not be achieved sufficiently. The specific gravity of the ground bituminous coal is preferably not less than 0.5, more preferably not less than 1.0. When ground bituminous coal having a specific gravity of less than 0.5 is used, processability during kneading may be degraded.

<Sulfur Component>

Examples of the sulfur component include powdered sulfur, precipitated sulfur, colloidal sulfur, insoluble sulfur, highly dispersible sulfur, and the like.

The amount of the sulfur component is preferably 0.1-5 parts by weight, more preferably 0.1-3 parts by weight, further preferably 0.1-2 parts by weight, based on 100 parts by weight of the rubber component.

<Other Components>

In the present invention, other component different from the aforementioned compound (I), a rubber component, a vulcanization accelerator, a filler and a sulfur component may also be used. As other component, one known in the rubber field can be used. Examples thereof include a compound capable of bonding with silica (e.g., silane coupling agent), vulcanization supplement accelerator, resin, viscoelasticity improving agent, anti-aging agent, processing aid, oil, wax, peptizing agent, retarder, compound having an oxyethylene unit, and catalyst (cobalt naphthenate etc.). Only one kind of any of other components may be used, or two or more kinds thereof may be used in combination.

Examples of the compound capable of bonding with silica include bis(3-triethoxysilylpropyl)tetrasulfide (e.g., "Si-69" manufactured by EVONIK), bis(3-triethoxysilylpropyl) disulfide (e.g., "Si-75" manufactured by EVONIK), bis(3-diethoxymethylsilylpropyl)tetrasulfide, bis(3-diethoxymethylsilylpropyl) disulfide, 3-octanoylthiopropyltriethoxysilane (alias: "S-[3-(triethoxysilyl)propyl] octanethioate ester", for example, "NXT silane" manufactured by General Electric Silicones), S-[3-{(2-methyl-1,3-propanedialkoxy)ethoxysilyl}propyl] octanethioate ester, S-[3-{(2-methyl-1,3-propanedialkoxy)methylsilyl}propyl] octanethioate ester, methyltrimethoxysilane, methyltriethoxysilane, methyltriacetoxysilane, methyltributoxysilane, ethyltrimethoxysilane, ethyltriethoxysilane, isobutyltrimethoxysilane, isobutyltriethoxysilane, n-octyltrimethoxysilane, n-octyltriethoxysilane, vinyltrimethoxysilane, vinyltriethoxysilane, vinyltris(methoxyethoxy)silane, phenyltrimethoxysilane, phenyltriethoxysilane, phenyltriacetoxysilane, 3-methacryloxypropyltrimethoxysilane, 3-methacryloxypropyltriethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, (3-glycidoxypropyl)trimethoxysilane, (3-glycidoxypropyl)triethoxysilane, 2-(3,4-epoxycyclohexyl)ethyltrimethoxysilane, 2-(3,4-epoxycyclohexyl)ethyltriethoxysilane, 3-isocyanatopropyltrimethoxysilane and 3-isocyanatopropyltriethoxysilane. Of these, bis(3-triethoxysilylpropyl)tetrasulfide (e.g., "Si-69" manufactured by EVONIK), bis(3-triethoxysilylpropyl) disulfide (e.g., "Si-75" manufactured by EVONIK), and 3-octanoylthiopropyltriethoxysilane (e.g., "NXT silane" manufactured by General Electric Silicones) are preferable.

When silica and a compound capable of bonding with silica are used, the amount thereof is preferably 2-10 parts by weight based on 100 parts by weight of silica.

In addition to a compound capable of bonding with silica, monovalent alcohols such as ethanol, butanol, octanol and the like; polyhydric alcohols such as ethylene glycol, diethylene glycol, triethylene glycol, polyethylene glycol, polypropylene glycol, pentaerythritol, polyether polyol and the like; N-alkylamine; amino acid; liquid polybutadiene having a carboxy-modified or amine-modified molecular terminal and the like may also be used.

Examples of the vulcanization supplement accelerator include zinc oxide, citraconimide compound, alkylphenolsulfur chloride condensate, organic thiosulfate compound and a compound represented by the formula (III)

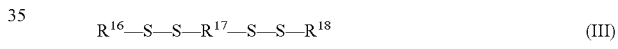

$R^{16}$—S—S—$R^{17}$—S—S—$R^{18}$ (III)

wherein $R^{17}$ is a $C_{2-10}$ alkanediyl group, and $R^{16}$ and $R^{18}$ are each independently a monovalent organic group containing a nitrogen atom. In the present invention, zinc oxide is encompassed in the concept of vulcanization supplement accelerator, and is not encompassed in the concept of the aforementioned filler.

When zinc oxide is used, the amount thereof is preferably 0.01-20 parts by weight, more preferably 0.1-15 parts by weight, further preferably 0.1-10 parts by weight, based on 100 parts by weight of the rubber component.

As the citraconimide compound, a biscitraconimide is preferable since it is thermally stable, and superior in dispersibility in a rubber component. Specific examples thereof include 1,2-biscitraconimidomethylbenzene, 1,3-biscitraconimidomethylbenzene, 1,4-biscitraconimidomethylbenzene, 1,6-biscitraconimidomethylbenzene, 2,3-biscitraconimidomethyltoluene, 2,4-biscitraconimidomethyltoluene, 2,5-biscitraconimidomethyltoluene, 2,6-biscitraconimidomethyltoluene, 1,2-biscitraconimidoethylbenzene, 1,3-biscitraconimidoethylbenzene, 1,4-biscitraconimidoethylbenzene, 1,6-biscitraconimidoethylbenzene, 2,3-biscitraconimidoethyltoluene, 2,4-biscitraconimidoethyltoluene, 2,5-biscitraconimidoethyltoluene, 2,6-biscitraconimidoethyltoluene and the like.

Of the citraconimide compounds, 1,3-biscitraconimidomethylbenzene represented by the following formula is preferable, since it is particularly thermally stable, particularly superior in dispersibility in a rubber component, and affords a vulcanized rubber composition with high hardness (Hs) (reversion control).

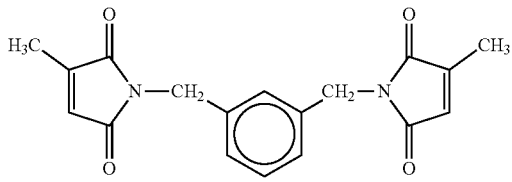

As the vulcanization supplement accelerator, an alkylphenol-sulfur chloride condensate represented by the formula (IV):

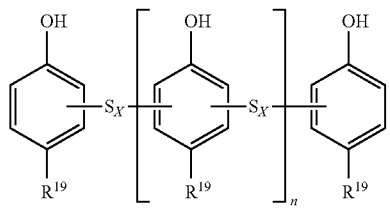

wherein n is an integer of 0-10, X is an integer of 2-4, and $R^{19}$ is a $C_{5-12}$ alkyl group, is preferably used since a vulcanized rubber composition with high hardness (Hs) can be obtained.

Since alkylphenol-sulfur chloride condensate (IV) shows superior dispersibility in a rubber component, n in the formula (IV) is preferably an integer of 1-9.

When X exceeds 4, alkylphenol-sulfur chloride condensate (IV) tends to be thermally unstable, and when X is 1, alkylphenol-sulfur chloride condensate (IV) has low sulfur content (weight of sulfur). Since high hardness can be efficiently exhibited (reversion inhibition), X is preferably 2.

$R^{19}$ is a $C_{5-12}$ alkyl group. Since alkylphenol-sulfur chloride condensate (IV) shows good dispersibility in a rubber component, $R^{19}$ is preferably a $C_{6-9}$ alkyl group.

Specific examples of the alkylphenol-sulfur chloride condensate (IV) include TACKIROL V200 wherein n in the formula (IV) is 0-10, X is 2, $R^{19}$ is an octyl group, and sulfur content is 24 wt %, which is manufactured by TAOKA CHEMICAL COMPANY, LIMITED.

As the vulcanization supplement accelerator, a salt of an organic thiosulfate compound represented by the formula (V):

$$HO_3S-S-(CH_2)_s-S-SO_3H \qquad (V)$$

wherein s is an integer of 3-10 (hereinafter sometimes to be indicated as "organic thiosulfate compound salt (V)") is preferably used since a vulcanized rubber composition with high hardness (Hs) can be obtained (reversion inhibition). Organic thiosulfate compound salt (V) containing crystal water may also be used. Examples of the organic thiosulfate compound salt (V) include lithium salt, potassium salt, sodium salt, magnesium salt, calcium salt, barium salt, zinc salt, nickel salt, cobalt salt and the like, and potassium salt and sodium salt are preferable.

s is an integer of 3-10, preferably an integer of 3-6. When s is not more than 2, sufficient heat fatigue resistance tends to be unachieved, and when s is 11 or more, organic thiosulfate compound salt (V) may not show sufficient heat fatigue resistance improving effect.

As organic thiosulfate compound salt (V), a sodium salt 1 hydrate or a sodium salt 2 hydrate thereof is preferable since it is stable at ambient temperature and under normal pressure, organic thiosulfate compound salt (V) obtained from sodium thiosulfate is more preferable from the aspect of cost, and sodium 1,6-hexamethylenedithiosulfate 2 hydrate represented by the following formula is more preferable.

It is preferable to use a compound represented by the formula (III):

$$R^{16}-S-S-R^{17}-S-S-R^{18} \qquad (III)$$

wherein $R^{17}$ is a $C_{2-10}$ alkanediyl group, and $R^{16}$ and $R^{18}$ are each independently a monovalent organic group containing a nitrogen atom,
as the vulcanization supplement accelerator, since it is dispersed well in a rubber component, and inserted in between $-S_X-$ crosslinking of alkylphenol-sulfur chloride condensate (IV) when used in combination with alkylphenol-sulfur chloride condensate (IV) to form a hybrid crosslinking with alkylphenol-sulfur chloride condensate (IV).

$R^{17}$ is a $C_{2-10}$ alkanediyl group, preferably a $C_{4-8}$ alkanediyl group, more preferably a linear $C_{4-8}$ alkanediyl group. $R^{17}$ is preferably linear. When the carbon number of $R^{17}$ is not more than 1, thermal stability may be low. When the carbon number of $R^{17}$ is not less than 11, the distance between polymers via a vulcanization supplement accelerator becomes long, and the effect of addition of a vulcanization supplement accelerator may not be obtained.

$R^{16}$ and $R^{18}$ are each independently a monovalent organic group containing a nitrogen atom. As the monovalent organic group containing a nitrogen atom, one containing at least one aromatic ring is preferable, and one containing an aromatic ring and a $=N-C(=S)-$ group is more preferable. $R^{16}$ and $R^{18}$ may be the same or different, and preferably the same for the reasons of easy production and the like.

Examples of the compound (III) include 1,2-bis(dibenzylthiocarbamoyldithio)ethane, 1,3-bis(dibenzylthiocarbamoyldithio)propane, 1,4-bis(dibenzylthiocarbamoyldithio)butane, 1,5-bis(dibenzylthiocarbamoyldithio)pentane, 1,6-bis(dibenzylthiocarbamoyldithio)hexane, 1,7-bis(dibenzylthiocarbamoyldithio)heptane, 1,8-bis(dibenzylthiocarbamoyldithio)octane, 1,9-bis(dibenzylthiocarbamoyldithio)nonane, 1,10-bis(dibenzylthiocarbamoyldithio)decane and the like. Of these, 1,6-bis(dibenzylthiocarbamoyldithio)hexane is preferable since it is thermally stable, and superior in dispersibility in a rubber component.

Examples of the commercially available product of compound (III) include VULCUREN TRIAL PRODUCT KA9188, VULCUREN VP KA9188 (1,6-bis(dibenzylthiocarbamoyldithio)hexane) manufactured by Bayer, Ltd.

In the present invention, organic compounds such as resorcinol and the like, resins such as resorcinol resin, modified resorcinol resin, cresol resin, modified cresol resin, phenol resin, modified phenol resin and the like may also be used. When resorcinol or these resins are used, elongation at break and complex modulus of elasticity of the vulcanized rubber composition can be improved. When the rubber composition is used for the production of a rubber product to be in contact with a cord, use of resorcinol or resin can enhance the adhesiveness to the cord.

Examples of resorcinol include resorcinol manufactured by Sumitomo Chemical Company, Limited, and the like. Examples of the resorcinol resin include resorcinol-formaldehyde condensate. Examples of the modified resorcinol resin include a resorcinol resin having a partly alkylated repeat unit. To be specific, Penacolite resin B-18-S, B-20 manufactured by Indspec, SUMIKANOL 620 manufactured by TAOKA CHEMICAL COMPANY, LIMITED, R-6 manufactured by Uniroyal, SRF 1501 manufactured by Schenectady Chemical, Arofene 7209 manufactured by Ashland Inc. and the like can be mentioned.

Examples of the cresol resin include cresol-formaldehyde condensate. Examples of the modified cresol resin include a cresol resin wherein the terminal methyl group is changed to a hydroxy group, and a cresol resin having a partly alkylated repeat unit. To be specific, SUMIKANOL 610 manufactured by TAOKA CHEMICAL COMPANY, LIMITED, PR-X11061 manufactured by Sumitomo Bakelite Co., Ltd., and the like can be mentioned.

Examples of the phenol resin include phenol-formaldehyde condensate. Examples of the modified phenol resin include phenol resin modified using cashew oil, tall oil, flaxseed oil, various animal and vegetable oils, unsaturated fatty acid, rosin, alkylbenzene resin, aniline, melamine and the like.

Examples of other resin include methoxylated methylolmelamine resins such as "SUMIKANOL 507AP" manufactured by Sumitomo Chemical Company, Limited and the like; coumarone-inden resins such as coumarone resin NG4 (softening point 81-100° C.) manufactured by Nippon Steel chemical, "process resin AC5" (softening point 75° C.) manufactured by KOBE OIL CHEMICAL INDUSTRIAL Co., Ltd. and the like; terpene-based resins such as terpene resin, terpene-phenol resin, aromatic-modified terpene resin and the like; rosin derivatives such as "Nikanol (registered trade mark) A70" (softening point 70-90° C.) manufactured by MITSUBISHI GAS CHEMICAL COMPANY, INC. and the like; hydrogenated rosin derivative; novolac alkylphenol-based resin; resol alkylphenol-based resin; C5 petroleum resin; and liquid polybutadiene.

Examples of the viscoelasticity improving agent include N,N'-bis(2-methyl-2-nitropropyl)-1,6-hexanediamine (e.g., "Sumifine (registered trade mark) 1162" manufactured by Sumitomo Chemical Company, Limited), dithiouracil compound described in JP-A-63-23942, "TACKIROL (registered trade mark) AP", "TACKIROL (registered trade mark) V-200" manufactured by TAOKA CHEMICAL COMPANY, LIMITED, alkylphenol-sulfur chloride condensate described in JP-A-2009-138148, 1,6-bis(dibenzylthiocarbamoyldithio)hexane (e.g., "KA9188" manufactured by Bayer, Ltd.), 1,6-hexamethylenedithiosulfate 2 sodium salt 2 hydrate, 1,3-bis(citraconimidomethyl)benzene (e.g., "Perkalink 900" manufactured by Flexsys), 1-benzoyl-2-phenylhydrazide, 1-hydroxy-N'-(1-methylethylidene)-2-naphthoic acid hydrazide, 3-hydroxy-N'-(1-methylethylidene)-2-naphthoic acid hydrazide, carboxylic acid hydrazide derivatives such as 1-hydroxy-N'-(1-methylpropylidene)-2-naphthoic acid hydrazide, 3-hydroxy-N'-(1-methylpropylidene)-2-naphthoic acid hydrazide, 1-hydroxy-N'-(1,3-dimethylbutylidene)-2-naphthoic acid hydrazide, 3-hydroxy-N'-(1,3-dimethylbutylidene)-2-naphthoic acid hydrazide, 1-hydroxy-N'-(2-furylmethylene)-2-naphthoic acid hydrazide, 3-hydroxy-N'-(2-furylmethylene)-2-naphthoic acid hydrazide and the like described in JP-A-2004-91505, 3-hydroxy-N'-(1,3-dimethylbutylidene)-2-naphthoic acid hydrazide, 3-hydroxy-N'-(1,3-diphenylethylidene)-2-naphthoic acid hydrazide, 3-hydroxy-N'-(1-methylethylidene)-2-naphthoic acid hydrazide described in JP-A-2000-190704, bismercaptooxadiazole compound described in JP-A-2006-328310, pyrithione salt compound described in JP-A-2009-40898, and cobalt hydroxides described in JP-A-2006-249361.

Examples of the anti-aging agent include those described in "GOMU KOGYO BINRAN (Rubber Industry Handbook) <fourth edition>" pp. 436-443, edited by The Society of Rubber Science and Technology, Japan. As the anti-aging agent, N-phenyl-N'-1,3-dimethylbutyl-p-phenylenediamine (abbreviation "6PPD", for example, "Antigen (registered trade mark) 6C" manufactured by Sumitomo Chemical Company, Limited), reaction product of aniline and acetone (abbreviation "TMDQ"), poly(2,2,4-trimethyl-1,2-)dihydroquinoline) (e.g., "Antioxidant FR" manufactured by MATSUBARA SANGYO), synthesis wax (paraffin wax etc.), or plant-derived wax is preferably used.

When an anti-aging agent is used, the amount thereof is preferably 0.01-15 parts by weight, more preferably 0.1-10 parts by weight, further preferably 0.1-5 parts by weight, based on 100 parts by weight of the rubber component.

Examples of the processing aid include fatty acids such as ricinoleic acid, palmitic acid, stearic acid, oleic acid, palmitic acid and the like, ester and amide thereof, fatty acid metal salts such as zinc stearate, barium stearate, calcium stearate, zinc laurate and the like, and the like. Examples of the commercially available product include "STRUKTOL A50P", "STRUKTOL A60", "STRUKTOL EF44", "STRUKTOL HT204", "STRUKTOL HT207", "STRUKTOL HT254", "STRUKTOL HT266", "STRUKTOL WB16" manufactured by SCHILL & SEILACHER Gmbh. & CO., and the like.

When a processing aid is used, the amount thereof is preferably 0.01-20 parts by weight, more preferably 0.1-15 parts by weight, further preferably 0.1-10 parts by weight, based on 100 parts by weight of the rubber component.

When stearic acid is used as the processing aid, the amount thereof is preferably 0.01-15 parts by weight, more preferably 0.1-10 parts by weight, further preferably 0.1-5 parts by weight, based on 100 parts by weight of the rubber component.

Examples of the oil include process oil, vegetable fat and oil and the like. Examples of the process oil include paraffinic process oil, naphthenic process oil, aromatic process oil, MES (mild extraction solvate) oil, and TDAE (treated distillate aromatic extract) oil. Examples of the commercially available product include aromatic oil ("NC-140" manufactured by Cosmo Oil Co., Ltd.), process oil ("Diana process PS32" manufactured by Idemitsu Kosan Co., Ltd.), and TDAE oil ("VivaTec 500" manufactured by H&R).

When an oil is used, the amount thereof is preferably 5-70 parts by weight, more preferably 20-60 parts by weight, based on 100 parts by weight of the rubber component.

Examples of the wax include "SANNOC (registered trade mark) wax" manufactured by OUCHI SHINKO CHEMICAL INDUSTRIAL CO., LTD., "OZOACE-0355" manufactured by Nippon Seiro Co., Ltd., and the like.

A peptizing agent is not particularly limited as long as it is typically used in the field of rubber. Examples thereof include aromatic mercaptan-based peptizing agent, aromatic disulfide-based peptizing agent, aromatic mercaptan metal salt-based peptizing agent, described in "GOMU KOGYO BINRAN (Rubber Industry Handbook) <fourth edition>" pp. 446-449 edited by The Society of Rubber Science and Technology, Japan. Of these, dixylyl disulfide and o,o'-dibenzamidodiphenyl disulfide ("NOCTIZER SS" manufactured by OUCHI SHINKO CHEMICAL INDUSTRIAL CO., LTD.) are preferable. Only one kind of peptizing agent may be used, or two or more kinds thereof may be used in combination.

When a peptizing agent is used, the amount thereof is preferably 0.01-1 part by weight, more preferably 0.05-0.5 parts by weight, based on 100 parts by weight of the rubber component.

Examples of the retarder include phthalic anhydride, benzoic acid, salicylic acid, N-nitrosodiphenylamine, N-(cyclohexylthio)phthalimide (CTP), sulfonamide derivative, diphenylurea, bis(tridecyl)pentaerythritol diphosphite and the like, and N-(cyclohexylthio)phthalimide (CTP) is preferably used.

When a retarder is used, the amount thereof is preferably 0.01-1 part by weight, more preferably 0.05-0.5 parts by weight, based on 100 parts by weight of the rubber component.

In the present invention, a compound having an oxyethylene unit having a structure represented by the formula: —O—(CH$_2$—CH$_2$O)$_r$—H wherein r is an integer of 1 or more may be used. In the above-mentioned formula, r is preferably 2 or more, more preferably 3 or more. In addition, r is preferably 16 or less, more preferably 14 or less. When r is 17 or more, compatibility with a rubber component and reinforcing performance tend to decrease.

The position of the oxyethylene unit in a compound having an oxyethylene unit may be main chain, or terminal, or side chain. From the aspects of the sustainability of the effect of preventing static electricity accumulation on the surface of the obtained tire and reduction of electrical resistance on the surface of the obtained tire, of the compounds having an oxyethylene unit, a compound having an oxyethylene unit at least on the side chain is preferable.

Examples of a compound having an oxyethylene unit in the main chain include polyoxyethylene alkyl ether, polyoxyethylene alkyl phenyl ether, monoethylene glycol, diethylene glycol, triethylene glycol, polyoxyethylene sorbitan fatty acid ester, polyoxyethylene polyoxypropylene alkyl ether, polyoxyethylene alkylamine, polyoxyethylene styrenated alkyl ether, polyoxyethylene alkylamide and the like.

When a compound having an oxyethylene unit at least in the side chain is used, the number of oxyethylene unit is preferably not less than 4, more preferably not less than 8, per 100 carbon atoms constituting the main chain. When the number of oxyethylene unit is not more than 3, the electrical resistance tends to increase. The number of oxyethylene unit is preferably not more than 12, more preferably not more than 10. When the number of oxyethylene unit is not less than 13, compatibility with a rubber component and reinforcing performance tend to decrease.

When a compound having an oxyethylene unit at least in the side chain is used, the main chain thereof is preferably mainly constituted of polyethylene, polypropylene or polystyrene.

<One Embodiment of the Present Invention>

In one embodiment of the present invention,
(1) solution-polymerized SBR alone having a molecular terminal modified with a silicon compound, or
(2) a blend of the aforementioned terminal modified solution-polymerized SBR as a main component and, at least one kind of rubber selected from the group consisting of unmodified solution-polymerized SBR, emulsion-polymerized SBR, natural rubber and BR as a sub component is used as the rubber component. Hereinafter this embodiment is abbreviated as "embodiment 1".

In embodiment 1, a blend of silica as a main component, and carbon black as a sub component is preferably used as the filler. In embodiment 1, moreover, a viscoelasticity improving agent such as N,N'-bis(2-methyl-2-nitropropyl)-1,6-hexanediamine ("Sumifine (registered trade mark) 1162" manufactured by Sumitomo Chemical Company, Limited), 5-nitroso-8-hydroxyquinoline (NQ-58), bis(3-triethoxysilylpropyl)tetrasulfide (Si-69), bis(3-triethoxysilylpropyl) disulfide (Si-75), 1,6-bis(N,N'-dibenzylthiocarbamoyldithio)-hexane ("KA9188" manufactured by Bayer, Ltd.), hexamethylenebisthiosulfate 2 sodium salt 2 hydrate, 1,3-bis(citraconimidomethyl)benzene ("Perkalink 900" manufactured by Flexsys), alkylphenol-sulfur chloride condensates such as "TACKIROL (registered trade mark) AP", "TACKIROL (registered trade mark) V-200" manufactured by TAOKA CHEMICAL COMPANY, LIMITED, or the like, or the like is preferably used in combination. The rubber composition of embodiment 1 is preferred as a rubber composition for a tire tread member of passenger car tires.

In one embodiment of the present invention, a rubber composition is obtained by kneading
(1) 100 parts by weight of an emulsion-polymerized styrene butadiene rubber and/or a solution-polymerized styrene butadiene rubber,
(2) 0.1-10 parts by weight of a vulcanization accelerator,
(3) 5-150 parts by weight of silica with a CTAB surface area of 60-180 m$^2$/g and a nitrogen adsorption specific surface area of 50-300 m$^2$/g, and
(4) 0.1-10 parts by weight of compound (I).

In the following, this embodiment is abbreviated as "embodiment 2". The amounts of components in embodiment 2 are based on 100 parts by weight of the rubber component (i.e., emulsion-polymerized styrene butadiene rubber and/or solution-polymerized styrene butadiene rubber). The rubber composition of embodiment 2 can afford a vulcanized rubber composition superior in abrasion resistance and durability, without markedly impairing viscoelastic property (low fuel consumption).

In one embodiment of the present invention, a rubber composition is obtained by kneading
(1) 100 parts by weight of a diene rubber (e.g., NR, IR, BR, SBR, IIR, halogenated IIR, CR, NBR etc.)
(2) preferably 0.1-10 parts by weight, more preferably 0.3-3 parts by weight, of compound (I),
(3) preferably 5-150 parts by weight of silica with a CTAB surface area of 60-180 m$^2$/g and a nitrogen adsorption specific surface area of 50-300 m$^2$/g,
(4) preferably 5-25 parts by weight of a resin (e.g., phenol resin, modified phenol resin etc.),
(5) preferably 5.1-7.0 parts by weight of sulfur,
(6) preferably 1.0-2.0 parts by weight of hexamethylenetramine,
(7) preferably 2.0-5.0 parts by weight of a sulfenamide vulcanization accelerator and/or a thiazole vulcanization accelerator, and
(8) preferably 0.1-5 parts by weight of at least one kind of vulcanization supplement accelerator selected from the group consisting of an alkylphenol-sulfur chloride condensate, an organic thiosulfate compound and the aforementioned compound (III).

In the following, this embodiment is abbreviated as "embodiment 3". The amounts of components in embodiment 3 are based on 100 parts by weight of the diene rubber.

The rubber composition of embodiment 3 is particularly preferably used as a rubber composition for bead apex and/or clinch apex since it shows good processability and affords a vulcanized rubber having a superior abrasion resistance.

<Production of Rubber Composition>

The rubber composition of the present invention can be produced by kneading a rubber component, a vulcanization accelerator, silica and compound (I), and other components as necessary.

The rubber composition of the present invention obtained by further mixing and kneading a sulfur component (hereinafter sometimes to be referred to as "the rubber composition of the present invention containing a sulfur component") can be produced by kneading a rubber component, a vulcanization accelerator, silica, compound (I) and a sulfur component, and other components as necessary. The rubber composition of the present invention containing a sulfur component is preferably produced via a step of kneading a rubber component, a filler such as silica or the like, and as necessary other component (hereinafter sometimes to be referred to as "step 1"), and then a step of kneading the rubber composition obtained in step 1, a sulfur component, and as necessary other component (hereinafter sometimes to be referred to as "step 2"). Furthermore, a pre-kneading step for masticating the rubber component may be included before step 1 (i.e., kneading rubber component, filler and the like) to facilitate processing of the rubber component.

In the production of a rubber composition of the present invention containing a sulfur component, the total amount of compound (I) may be kneaded with a rubber component and the like in any of the pre-kneading step, step 1 and step 2, or compound (I) may each be divided and kneaded with a rubber component and the like in at least two steps of pre-kneading step-step 2. Compound (I) may be previously supported on the aforementioned filler in advance, and then kneaded with a rubber component and the like.

When zinc oxide is added, it is preferably kneaded with a rubber component and the like in step 1. When stearic acid is added, it is preferably kneaded with a rubber component and the like in step 1. When a vulcanization accelerator is added, it is preferably kneaded with a rubber component and the like in step 2. When a peptizing agent is added, it is preferably kneaded with a rubber component and the like in step 1. When a pre-kneading step is performed, it is preferable to knead the total amount of the peptizing agent with a rubber component in the pre-kneading step or divide the peptizing agent and knead a part thereof with the rubber component in both the pre-kneading step and step 1. When a retarder is added, it is preferably kneaded with a rubber component and the like in step 2.

For kneading in step 1, for example, internal mixer including Banbury mixer, open kneader, pressure kneader, extruder, injection molder and the like can be used. The discharging temperature of the rubber composition after kneading in step 1 is preferably not more than 200° C., more preferably 120-180° C.

For kneading in step 2, for example, open roll, calendar and the like can be used. The kneading temperature (temperature rubber composition being kneaded) in step 2 is preferably 60-120° C.

<Production of Vulcanized Rubber Composition>

A vulcanized rubber composition can be produced by vulcanizing the rubber composition of the present invention containing a sulfur component. A vulcanized rubber composition may also be produced by vulcanizing the rubber composition of the present invention containing a sulfur component after processing into a particular shape.

The vulcanizing temperature is preferably 120-180° C. Those of ordinary skill in the art can appropriately determine the vulcanizing time according to the composition of the rubber composition. Vulcanization is generally performed under normal pressure or under pressure.

<Application>

The rubber composition and vulcanized rubber composition of the present invention are useful for producing various products (e.g., tire, tire member, vibration-proof rubber, conveyor belt rubber, engine mount rubber etc.). As such product, a tire and a tire member are preferred, and a tire is more preferred. Examples of the tire member include a tire belt member containing a vulcanized rubber composition of the present invention and a steel cord, a tire carcass member containing a vulcanized rubber composition of the present invention and a carcass fiber cord, a tire side wall member, a tire inner liner member, a tire cap tread member and a tire under tread member.

EXAMPLE

While the present invention is more specifically described in the following by referring to Examples and the like, the present invention is not limited by the following Examples and the like, and appropriate modifications can also be added within the scope compatible with the gist described above and below, all of which are included in the technical scope of the present invention.

Production Example 1: Production of Compound (Ia)

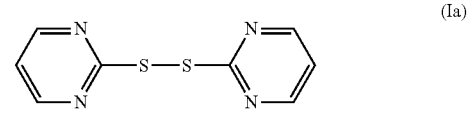 [SMILES: c1cnc(SSc2ncccn2)nc1]

To 2-mercaptopyrimidine (22.9 g, 0.20 mol) was added ethyl acetate (500 mL), and 2-mercaptopyrimidine in a clump was pulverized by ultrasonication (40° C., 30 min). Thereto was added sodium iodide (3.0 g, 0.020 mol), a 35 wt % aqueous hydrogen peroxide solution (19.4 mL, 0.200 mol) was added dropwise at room temperature over about 2 hr to generate heat, and the total amount of the aqueous hydrogen peroxide solution was added dropwise, whereby a complete solution was obtained. The solution was stirred at room temperature for 45 min, the disappearance of 2-mercaptopyrimidine was confirmed by TLC, a 100 mL aqueous solution of sodium thiosulfate (35.0 g, 0.22 mol) was added to the solution to quench the reaction, and disappearance of hydrogen peroxide was confirmed with peroxide test paper. The obtained solution was transferred to a separating funnel, extracted twice with ethyl acetate (150 mL), and the combined organic layer was washed with saturated brine (100 mL). The separated organic layer was dehydrated with sodium sulfate and the solid was removed by filtration. The filtrate was concentrated by an evaporator and dried under reduced pressure to give compound (Ia) (i.e., 2,2'-dipyrimidyl disulfide) (21.8 g, yield 98%) as a pale-yellow solid.
$^1$H-NMR (CDCl$_3$, 400 MHz) δ ppm: 7.10 (4H, t, J=4.8 Hz), 8.56 (2H, d, J=4.8 Hz)

Production Example 2: Production of Compound (Ib-1)

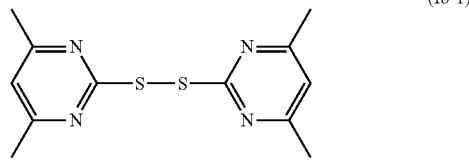

(Ib-1)

To 4,6-dimethyl-2-mercaptopyrimidine (21.5 g, 0.15 mol) was added ethyl acetate (500 mL), and 4,6-dimethyl-2-mercaptopyrimidine in a clump was pulverized by ultrasonication (40° C., 30 min). Thereto was added sodium iodide (2.3 g, 0.015 mol), and a 35 wt % aqueous hydrogen peroxide solution (14.4 mL, 0.15 mol) was added dropwise at room temperature over 1 hr 33 min, whereby heat generation was confirmed. When the total amount of the aqueous hydrogen peroxide solution was added dropwise, a complete solution was not obtained, and a dispersion with a solid partially precipitated therein was obtained. The dispersion was stirred at room temperature for 8 hr 40 min, the disappearance of 4,6-dimethyl-2-mercaptopyrimidine was confirmed by TLC, an aqueous saturated sodium thiosulfate solution (100 mL) was added to quench the reaction, and disappearance of hydrogen peroxide was confirmed with peroxide test paper. The precipitated solid was separated by suction filtration, and washed with water and then ethyl acetate. The filtrate was transferred to a separating funnel, extracted twice with ethyl acetate (250 mL), and the combined organic layer was washed with saturated brine (100 mL), dehydrated with sodium sulfate and the solid was removed by filtration. The filtrate was concentrated by an evaporator to give a solid. The solid separated by suction filtration and the solid obtained by the evaporator were combined and dried under reduced pressure to give compound (Ib-1) (i.e., 2,2'-bis(4,6-dimethylpyrimidyl) disulfide) (21.0 g, yield 98%) as a pale-yellow solid. $^1$H-NMR (CDCl$_3$, 400 MHz) δ ppm: 2.39 (12H, s), 6.76 (2H, s)

Example 1

<Step 1>

Using a Banbury mixer (600 mL Labo Plastomill manufactured by Toyo Seiki), a styrene-butadiene copolymer rubber ("SBR Tufdene 2000" manufactured by Asahi Kasei Corporation) (100 parts by weight), silica ("Nipsil (registered trade mark) AQ" manufactured by Tosoh Silica Corporation, BET specific surface area: 205 m$^2$/g) (70 parts by weight), carbon black HAF ("Asahi #70" manufactured by Asahi Carbon Co., Ltd.) (5 parts by weight), stearic acid (2 parts by weight), zinc oxide (3 parts by weight), an anti-aging agent (N-phenyl-N'-1,3-dimethylbutyl-p-phenylenediamine (6PPD), "Antigen (registered trade mark) 6C" manufactured by Sumitomo Chemical Company, Limited) (1.5 parts by weight), TDAE oil ("VivaTec 500" manufactured by H&R) (30 parts by weight), a compound capable of bonding with silica ("Si-75" manufactured by EVONIK) (7 parts by weight), and compound (Ia) (0.50 parts by weight) were kneaded to give a rubber composition. In this step, the components were kneaded for 5 min under conditions of mixer preset temperature 140° C. and mixer rotation speed 60 rpm. The temperature of the rubber composition after completion of kneading was 160-170° C.

<Step 2>

Using an open roll mill at roll preset temperature 50° C., the rubber composition obtained in step 1, vulcanization accelerators (N-cyclohexyl-2-benzothiazolylsulfenamide (CBS) (2.45 parts by weight) and diphenylguanidine (DPG) (1.64 parts by weight)), and powdered sulfur ("fine sulfur powder" manufactured by Hosoi Chemical) (1.05 parts by weight) were kneaded to give a rubber composition.

<Vulcanization>

The rubber composition obtained in step 2 was heated at 170° C. for 10 min to give a vulcanized rubber composition. Such vulcanized rubber composition is preferable for a cap tread.

Examples 2-5, Reference Example 1 and Comparative Example 1

In the same manner as in Example 1 except that components in the kind and amount shown in Table 1 were used in steps 1 and 2, the vulcanized rubber compositions of Examples 2-5, Reference Example 1 and Comparative Example 1 were obtained.

For the evaluation of the below-mentioned low fuel consumption and abrasion resistance, the amounts of the powdered sulfur, CBS and DPG were adjusted in Examples 1-5, Reference Example 1 and Comparative Example 1 so that the hardness of the vulcanized rubber compositions of Examples 1-5 and Comparative Example 1 and the hardness of the vulcanized rubber composition of Reference Example 1 would be equivalent. The same applies to the below-mentioned Example 6 and the like.

<Evaluation of Low Fuel Consumption>

Using the GABO EPLEXOR dynamic viscoelastic analyzer, the viscoelastic property of the vulcanized rubber compositions obtained in Examples 1-5 using compound (Ia) or compound (Ib-1), the vulcanized rubber composition obtained Comparative Example 1 using 4,4'-dipyridyl disulfide, and the vulcanized rubber composition obtained in Reference Example 1 without using these compounds was measured, and the loss factor (tan δ) at 60° C. and 2.5% strain was determined. By the following formula:

index of low fuel consumption=100×(tan δ of Reference Example 1)/(tan δ of Examples 1-5 or Comparative Example 1), an index of low fuel consumption of the vulcanized rubber compositions of Examples 1-5 and Comparative Example 1 was calculated. The results are shown in Table 1. A greater index means good low fuel consumption (rolling resistance property).

<Evaluation of Abrasion Resistance>

Using DIN abrasion tester AB-6111 (manufactured by Ueshima Seisakusho Co., Ltd.) and based on JIS K6264-2: 2005 "Rubber, vulcanized or thermoplastic—Determination of abrasion resistance", the abrasion volume (unit: mm$^3$) of the vulcanized rubber compositions obtained in Examples 1-5 using compound (Ia) or compound (Ib-1), the vulcanized rubber composition obtained Comparative Example 1 using 4,4'-dipyridyl disulfide, and the vulcanized rubber composition obtained in Reference Example 1 without using these compounds was measured. By the following formula:

index of abrasion resistance=100×(abrasion volume of Reference Example 1)/(abrasion volume of Examples 1-5 or Comparative Example 1), an index of abrasion resistance of the vulcanized rubber compositions of Examples 1-5 and Comparative Example 1 was calculated. The results are shown in Table 1. A greater index means good abrasion resistance.

TABLE 1

| | | Example 1 | Example 2 | Example 3 | Example 4 | Example 5 | Reference Example 1 | Comparative Example 1 |
|---|---|---|---|---|---|---|---|---|
| step 1 | styrene-butadiene copolymer rubber (SBR Tufdene 2000) (parts) | 100 | 100 | 100 | 100 | 100 | 100 | 100 |
| | silica (Nipsil AQ) (parts) | 70 | 70 | 70 | 70 | 70 | 70 | 70 |
| | carbon black HAF (parts) | 5 | 5 | 5 | 5 | 5 | 5 | 5 |
| | stearic acid (parts) | 2 | 2 | 2 | 2 | 2 | 2 | 2 |
| | zinc oxide (parts) | 3 | 3 | 3 | 3 | 3 | 3 | 3 |
| | anti-aging agent (parts) | 1.5 | 1.5 | 1.5 | 1.5 | 1.5 | 1.5 | 1.5 |
| | compound (Ia) (parts) | 0.5 | 1 | — | — | — | — | — |
| | compound (Ib-1) (parts) | — | — | — | 0.62 | — | — | — |
| | 4,4'-dipyridyl disulfide (parts) | — | — | — | — | — | — | 0.49 |
| | TDAE oil (parts) | 30 | 30 | 30 | 30 | 30 | 30 | 30 |
| | compound capable of bonding with silica (parts) | 7 | 7 | 7 | 7 | 7 | 7 | 7 |
| step 2 | powdered sulfur (parts) | 1.05 | 1 | 1 | 0.95 | 1.08 | 1.15 | 1.1 |
| | CBS (parts) | 2.45 | 2.33 | 2.33 | 2.21 | 2.52 | 2.8 | 2.56 |
| | DPG (parts) | 1.64 | 1.56 | 1.56 | 1.48 | 1.68 | 1.87 | 1.71 |
| | compound (Ia) (parts) | — | — | 0.5 | 1 | — | — | — |
| evaluation | index of low fuel consumption | 99 | 99 | 98 | 97 | 97 | — | 95 |
| | index of abrasion resistance | 115 | 116 | 127 | 150 | 124 | — | 101 |

(parts = parts by weight)

As shown in Table 1, in Comparative Example 1 using 4,4'-dipyridyl disulfide, the abrasion resistance of the vulcanized rubber composition was scarcely improved (index of abrasion resistance=101). On the other hand, in Examples 1-5 using compound (Ia) or compound (Ib-1), the abrasion resistance of the vulcanized rubber composition could be improved (index of abrasion resistance=115-150) without markedly impairing low fuel consumption thereof (index of low fuel consumption=97-99).

Example 6 and Reference Example 2

In the same manner as in Example 1 except that components in the kind and amount shown in Table 2 were used in steps 1 and 2, the vulcanized rubber compositions of Example 6 and Reference Example 2 were obtained. The same description in Tables 1 and 2 shows the same component.

<Evaluation of Low Fuel Consumption>

In the same manner as in the above except that, in the above-mentioned formula of the index of low fuel consumption, the tan δ of Reference Example 2 was used instead of the tan δ of Reference Example 1 and the tan δ of Example 6 was used instead of the tan δ of Examples 1-5 or Comparative Example 1, the index of the low fuel consumption of the vulcanized rubber composition of Example 6 was calculated. The results are shown in Table 2.

<Evaluation of Abrasion Resistance>

In the same manner as in the above except that, in the above-mentioned formula of the index of abrasion resistance, the abrasion volume of Reference Example 2 was used instead of the abrasion volume of Reference Example 1 and the abrasion volume of Example 6 was used instead of the abrasion volume of Examples 1-5 or Comparative Example 1, the index of the abrasion resistance of the vulcanized rubber composition of Example 6 was calculated. The results are shown in Table 2.

TABLE 2

| | | Example 6 | Reference Example 2 |
|---|---|---|---|
| step 1 | styrene-butadiene copolymer rubber (SBR Tufdene 2000) (parts) | 100 | 100 |
| | silica (Nipsil AQ) (parts) | 75 | 75 |
| | carbon black HAF (parts) | 5 | 5 |
| | stearic acid (parts) | 2 | 2 |
| | zinc oxide (parts) | 3 | 3 |
| | anti-aging agent (parts) | 1.5 | 1.5 |
| | compound (Ib-1) (parts) | 1.24 | — |
| | TDAE oil (parts) | 30 | 30 |
| | compound capable of bonding with silica (parts) | 6 | 6 |
| step 2 | powdered sulfur (parts) | 1.6 | 2 |
| | CBS (parts) | 1.2 | 1.5 |
| | DPG (parts) | 2 | 2 |
| evaluation | index of low fuel consumption | 96 | — |
| | index of abrasion resistance | 141 | — |

(parts = parts by weight)

Example 7 and Reference Example 3

In the same manner as in Example 1 except that components in the kind and amount shown in Table 3 were used in steps 1 and 2, the vulcanized rubber compositions of Example 7 and Reference Example 3 were obtained. The same description in Tables 1 and 3 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 3 was used instead of the tan δ of Reference Example 1 and the tan δ of Example 7 was used instead of the tan δ of Examples 1-5 or Comparative Example 1, the index of the low fuel consumption of the vulcanized rubber composition of Example 7 was calculated. The results are shown in Table 3.

<Evaluation of Abrasion Resistance>

In the same manner as in the above except that, in the above-mentioned formula of the index of abrasion resistance, the abrasion volume of Reference Example 3 was used instead of the abrasion volume of Reference Example 1 and the abrasion volume of Example 7 was used instead of the abrasion volume of Examples 1-5 or Comparative Example 1, the index of the abrasion resistance of the vulcanized rubber composition of Example 7 was calculated. The results are shown in Table 3.

TABLE 3

|  |  | Example 7 | Reference Example 3 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6 | 6 |
| step 2 | powdered sulfur (parts) | 1.5 | 2 |
|  | CBS (parts) | 1.13 | 1.5 |
|  | DPG (parts) | 2 | 2 |
| evaluation | index of low fuel consumption | 94 | — |
|  | index of abrasion resistance | 185 | — |

(parts = parts by weight)

Example 8 and Reference Example 4

In the same manner as in Example 1 except that components in the kind and amount shown in Table 4 were used in steps 1 and 2, the vulcanized rubber compositions of Example 8 and Reference Example 4 were obtained. The same description in Tables 1 and 4 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 4 was used instead of the tan δ of Reference Example 1 and the tan δ of Example 8 was used instead of the tan δ of Examples 1-5 or Comparative Example 1, the index of the low fuel consumption of the vulcanized rubber composition of Example 8 was calculated. The results are shown in Table 4.

<Evaluation of Abrasion Resistance>

In the same manner as in the above except that, in the above-mentioned formula of the index of abrasion resistance, the abrasion volume of Reference Example 4 was used instead of the abrasion volume of Reference Example 1 and the abrasion volume of Example 8 was used instead of the abrasion volume of Examples 1-5 or Comparative Example 1, the index of the abrasion resistance of the vulcanized rubber composition of Example 8 was calculated. The results are shown in Table 4.

TABLE 4

|  |  | Example 8 | Reference Example 4 |
|---|---|---|---|
| step 1 | styrene-butadiene copolymer rubber (SBR Tufdene 2000) (parts) | 60 | 60 |
|  | butadiene rubber (BR01) (parts) | 40 | 40 |
|  | silica (Nipsil AQ) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6 | 6 |
| step 2 | powdered sulfur (parts) | 1.6 | 2 |
|  | CBS (parts) | 1.2 | 1.5 |
|  | DPG (parts) | 2 | 2 |
| evaluation | index of low fuel consumption | 98 | — |
|  | index of abrasion resistance | 193 | — |

(parts = parts by weight)

Example 9 and Reference Example 5

In the same manner as in Example 1 except that components in the kind and amount shown in Table 5 were used in steps 1 and 2, the vulcanized rubber compositions of Example 9 and Reference Example 5 were obtained. The same description in Tables 1 and 5 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 5 was used instead of the tan δ of Reference Example 1 and the tan δ of Example 9 was used instead of the tan δ of Examples 1-5 or Comparative Example 1, the index of the low fuel consumption of the vulcanized rubber composition of Example 9 was calculated. The results are shown in Table 5.

<Evaluation of Abrasion Resistance>

In the same manner as in the above except that, in the above-mentioned formula of the index of abrasion resistance, the abrasion volume of Reference Example 5 was used instead of the abrasion volume of Reference Example 1 and the abrasion volume of Example 9 was used instead of the abrasion volume of Examples 1-5 or Comparative Example 1, the index of the abrasion resistance of the vulcanized rubber composition of Example 9 was calculated. The results are shown in Table 5.

TABLE 5

|  |  | Example 9 | Reference Example 5 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 45 | 45 |
|  | carbon black HAF (parts) | 5 | 5 |
|  | stearic acid (parts) | 2 | 2 |
|  | zinc oxide (parts) | 3 | 3 |

TABLE 5-continued

|  |  | Example 9 | Reference Example 5 |
|---|---|---|---|
|  | anti-aging agent (parts) | 1.5 | 1.5 |
|  | compound (Ib-1) (parts) | 1.24 | — |
|  | compound capable of bonding with silica (parts) | 3.6 | 3.6 |
| step 2 | powdered sulfur (parts) | 2 | 2 |
|  | CBS (parts) | 1.5 | 1.5 |
|  | DPG (parts) | 2 | 2 |
| evaluation | index of low fuel consumption | 111 | — |
|  | index of abrasion resistance | 113 | — |

(parts = parts by weight)

Example 10 and Reference Example 6

In the same manner as in Example 1 except that components in the kind and amount shown in Table 6 were used in steps 1 and 2, the vulcanized rubber compositions of Example 10 and Reference Example 6 were obtained. The same description in Tables 1 and 6 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 6 was used instead of the tan δ of Reference Example 1 and the tan δ of Example 10 was used instead of the tan δ of Examples 1-5 or Comparative Example 1, the index of the low fuel consumption of the vulcanized rubber composition of Example 10 was calculated. The results are shown in Table 6.

<Evaluation of Abrasion Resistance>

In the same manner as in the above except that, in the above-mentioned formula of the index of abrasion resistance, the abrasion volume of Reference Example 6 was used instead of the abrasion volume of Reference Example 1 and the abrasion volume of Example 10 was used instead of the abrasion volume of Examples 1-5 or Comparative Example 1, the index of the abrasion resistance of the vulcanized rubber composition of Example 10 was calculated. The results are shown in Table 6.

TABLE 6

|  |  | Example 10 | Reference Example 6 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 100 | 100 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 55 | 55 |
|  | compound capable of bonding with silica (parts) | 8 | 8 |
| step 2 | powdered sulfur (parts) | 1.6 | 2 |
|  | CBS (parts) | 1.2 | 1.5 |
|  | DPG (parts) | 2 | 2 |
| evaluation | index of low fuel consumption | 102 | — |
|  | index of abrasion resistance | 117 | — |

(parts = parts by weight)

Example 11 and Reference Example 7

In the same manner as in Example 1 except that components in the kind and amount shown in Table 7 were used in steps 1 and 2, the vulcanized rubber compositions of Example 11 and Reference Example 7 were obtained. The same description in Tables 1 and 7 shows the same component. As the butadiene rubber, "BR01" manufactured by JSR was used, and "Ultrasil 9100GR" (BET specific surface area: 235 m²/g) manufactured by EVONIK was used silica.

<Evaluation of Low Fuel Consumption>

In the same manner as in the above except that, in the above-mentioned formula of the index of low fuel consumption, the tan δ of Reference Example 7 was used instead of the tan δ of Reference Example 1 and the tan δ of Example 11 was used instead of the tan δ of Examples 1-5 or Comparative Example 1, the index of the low fuel consumption of the vulcanized rubber composition of Example 11 was calculated. The results are shown in Table 7.

<Evaluation of Abrasion Resistance>

In the same manner as in the above except that, in the above-mentioned formula of the index of abrasion resistance, the abrasion volume of Reference Example 7 was used instead of the abrasion volume of Reference Example 1 and the abrasion volume of Example 11 was used instead of the abrasion volume of Examples 1-5 or Comparative Example 1, the index of the abrasion resistance of the vulcanized rubber composition of Example 11 was calculated. The results are shown in Table 7.

TABLE 7

|  |  | Example 11 | Reference Example 7 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Ultrasil 9100GR) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 7.5 | 7.5 |
| step 2 | powdered sulfur (parts) | 1.6 | 2 |
|  | CBS (parts) | 1.2 | 1.5 |
|  | DPG (parts) | 2 | 2 |
| evaluation | index of low fuel consumption | 98 | — |
|  | index of abrasion resistance | 136 | — |

(parts = parts by weight)

Example 12 and Reference Example 8

In the same manner as in Example 1 except that components in the kind and amount shown in Table 8 were used in steps 1 and 2, the vulcanized rubber compositions of Example 12 and Reference Example 8 were obtained. The same description in Tables 1 and 8 shows the same component. As the butadiene rubber, "BR01" manufactured by JSR was used, and "Zeosil (registered trade mark) 1115MP" (BET specific surface area: 115 m²/g) manufactured by Solvay was used as silica.

<Evaluation of Low Fuel Consumption>

In the same manner as in the above except that, in the above-mentioned formula of the index of low fuel consumption, the tan δ of Reference Example 8 was used instead of the tan δ of Reference Example 1 and the tan δ of Example 12 was used instead of the tan δ of Examples 1-5 or Comparative Example 1, the index of the low fuel consumption of the vulcanized rubber composition of Example 12 was calculated. The results are shown in Table 8.

<Evaluation of Abrasion Resistance>

In the same manner as in the above except that, in the above-mentioned formula of the index of abrasion resistance, the abrasion volume of Reference Example 8 was used instead of the abrasion volume of Reference Example 1 and the abrasion volume of Example 12 was used instead of the abrasion volume of Examples 1-5 or Comparative Example 1, the index of the abrasion resistance of the vulcanized rubber composition of Example 12 was calculated. The results are shown in Table 8.

TABLE 8

|  |  | Example 12 | Reference Example 8 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Zeosil 1115MP) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6 | 6 |
| step 2 | powdered sulfur (parts) | 1.8 | 2 |
|  | CBS (parts) | 1.4 | 1.5 |
|  | DPG (parts) | 2 | 2 |
| evalua- tion | index of low fuel consumption | 106 | — |
|  | index of abrasion resistance | 151 | — |

(parts = parts by weight)

Example 13 and Reference Example 9

In the same manner as in Example 1 except that components in the kind and amount shown in Table 9 were used in steps 1 and 2, the vulcanized rubber compositions of Example 13 and Reference Example 9 were obtained. The same description in Tables 1 and 9 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 9 was used instead of the tan δ of Reference Example 1 and the tan δ of Example 13 was used instead of the tan δ of Examples 1-5 or Comparative Example 1, the index of the low fuel consumption of the vulcanized rubber composition of Example 13 was calculated. The results are shown in Table 9.

<Evaluation of Abrasion Resistance>

In the same manner as in the above except that, in the above-mentioned formula of the index of abrasion resistance, the abrasion volume of Reference Example 9 was used instead of the abrasion volume of Reference Example 1 and the abrasion volume of Example 13 was used instead of the abrasion volume of Examples 1-5 or Comparative Example 1, the index of the abrasion resistance of the vulcanized rubber composition of Example 13 was calculated. The results are shown in Table 9.

TABLE 9

|  |  | Example 13 | Reference Example 9 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6 | 6 |
| step 2 | powdered sulfur (parts) | 1 | 1.2 |
|  | CBS (parts) | 2.3 | 2.7 |
|  | DPG (parts) | 1.8 | 1.8 |
| evalua- tion | index of low fuel consumption | 103 | — |
|  | index of abrasion resistance | 129 | — |

(parts = parts by weight)

Comparative Example 2 and Reference Example 10

In the same manner as in Example 1 except that components in the kind and amount shown in Table 10 were used in steps 1 and 2, the vulcanized rubber compositions of Comparative Example 2 and Reference Example 10 were obtained. The same description in Tables 1 and 10 shows the same component. As the butadiene rubber, "BR01" manufactured by JSR was used, and "Asahi #80" (ISAF) manufactured by Asahi Carbon Co., Ltd. was used as carbon black.

<Evaluation of Low Fuel Consumption>

In the same manner as in the above except that, in the above-mentioned formula of the index of low fuel consumption, the tan δ of Reference Example 10 was used instead of the tan δ of Reference Example 1 and the tan δ of Comparative Example 2 was used instead of the tan δ of Examples 1-5 or Comparative Example 1, the index of the low fuel consumption of the vulcanized rubber composition of Comparative Example 26 was calculated. The results are shown in Table 10.

<Evaluation of Abrasion Resistance>

In the same manner as in the above except that, in the above-mentioned formula of the index of abrasion resistance, the abrasion volume of Reference Example 10 was used instead of the abrasion volume of Reference Example 1 and the abrasion resistance of Comparative Example 2 was used instead of the abrasion volume of Examples 1-5 or Comparative Example 1, the index of the abrasion resistance of the vulcanized rubber composition of Comparative Example 2 was calculated. The results are shown in Table 10.

TABLE 10

|  |  | Comparative Example 2 | Reference Example 10 |
|---|---|---|---|
| step 1 | styrene-butadiene copolymer rubber (SBR Tufdene 2000) (parts) | 80 | 80 |
|  | butadiene rubber (BR01) (parts) | 20 | 20 |

TABLE 10-continued

|  |  | Comparative Example 2 | Reference Example 10 |
|---|---|---|---|
|  | carbon black ISAF (parts) | 45 | 45 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
| step 2 | powdered sulfur (parts) | 1.8 | 2 |
|  | CBS (parts) | 1.3 | 1.5 |
| evaluation | index of low fuel consumption | 94 | — |
|  | index of abrasion resistance | 99 | — |

(parts = parts by weight)

As shown in Table 10, in Comparative Example 2 using carbon black alone as the filler, the abrasion resistance of the vulcanized rubber composition could not be improved (index of abrasion resistance=99) even though compound (Ib-1) was used.

Example 14 and Reference Example 11

In the same manner as in Example 1 except that components in the kind and amount shown in Table 11 were used in steps 1 and 2, the vulcanized rubber compositions of Example 14 and Reference Example 11 were obtained. The same description in Tables 1 and 11 shows the same component. As the butadiene rubber, "BR01" manufactured by JSR was used, and diphenylguanidine (DPG) and 2-mercaptobenzothiazole (MBT), which are non-sulfenamide vulcanization accelerators, were used as the vulcanization accelerator.

<Evaluation of Low Fuel Consumption>

In the same manner as in the above except that, in the above-mentioned formula of the index of low fuel consumption, the tan δ of Reference Example 11 was used instead of the tan δ of Reference Example 1 and the tan δ of Example 14 was used instead of the tan δ of Examples 1-5 or Comparative Example 1, the index of the low fuel consumption of the vulcanized rubber composition of Example 14 was calculated. The results are shown in Table 11.

<Evaluation of Abrasion Resistance>

In the same manner as in the above except that, in the above-mentioned formula of the index of abrasion resistance, the abrasion volume of Reference Example 11 was used instead of the abrasion volume of Reference Example 1 and the abrasion volume of Example 14 was used instead of the abrasion volume of Examples 1-5 or Comparative Example 1, the index of the abrasion resistance of the vulcanized rubber composition of Example 14 was calculated. The results are shown in Table 11.

TABLE 11

|  |  | Example 14 | Reference Example 11 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 75 | 75 |
|  | carbon black HAF (parts) | 5 | 5 |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6 | 6 |
| step 2 | powdered sulfur (parts) | 2 | 2 |
|  | DPG (parts) | 2 | 2 |
|  | MET (parts) | 1 | 1 |
| evaluation | index of low fuel consumption | 101 | — |
|  | index of abrasion resistance | 137 | — |

(parts = parts by weight)

Example 15 and Reference Example 12

In the same manner as in Example 1 except that components in the kind and amount shown in Table 12 were used in steps 1 and 2, the vulcanized rubber compositions of Example 15 and Reference Example 12 were obtained. The same description in Tables 1 and 12 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 12 was used instead of the tan δ of Reference Example 1 and the tan δ of Example 15 was used instead of the tan δ of Examples 1-5 or Comparative Example 1, the index of the low fuel consumption of the vulcanized rubber composition of Example 15 was calculated. The results are shown in Table 12.

<Evaluation of Abrasion Resistance>

In the same manner as in the above except that, in the above-mentioned formula of the index of abrasion resistance, the abrasion volume of Reference Example 12 was used instead of the abrasion volume of Reference Example 1 and the abrasion volume of Example 15 was used instead of the abrasion volume of Examples 1-5 or Comparative Example 1, the index of the abrasion resistance of the vulcanized rubber composition of Example 15 was calculated. The results are shown in Table 12.

TABLE 12

|  |  | Example 15 | Reference Example 12 |
|---|---|---|---|
| step 1 | styrene-butadiene copolymer rubber (SBR Tufdene 2000) (parts) | 80 | 80 |
|  | butadiene rubber (BR01) (parts) | 20 | 20 |
|  | silica (Nipsil AQ) (parts) | 80 | 80 |
|  | carbon black HAF (parts) | — | — |
|  | stearic acid (parts) | 2 | 2 |
|  | zinc oxide (parts) | 3 | 3 |
|  | anti-aging agent (parts) | 1.5 | 1.5 |
|  | compound (Ib-1) (parts) | 1.24 | — |
|  | TDAE oil (parts) | 30 | 30 |
|  | compound capable of bonding with silica (parts) | 6.4 | 6.4 |
| step 2 | powdered sulfur (parts) | 1.6 | 2 |
|  | CBS (parts) | 1.2 | 1.5 |
|  | DPG (parts) | 2 | 2 |
| evaluation | index of low fuel consumption | 95 | — |
|  | index of abrasion resistance | 149 | — |

(parts = parts by weight)

Example 16 and Reference Example 13

In the same manner as in Example 1 except that components in the kind and amount shown in Table 13 were used in steps 1 and 2, the vulcanized rubber compositions of Example 16 and Reference Example 13 were obtained. The same description in Tables 1 and 13 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 13 was used instead of the tan δ of Reference Example 1 and the tan δ of Example 16 was used instead of the tan δ of Examples 1-5 or Comparative Example 1, the index of the low fuel consumption of the vulcanized rubber composition of Example 16 was calculated. The results are shown in Table 13.

<Evaluation of Abrasion Resistance>

In the same manner as in the above except that, in the above-mentioned formula of the index of abrasion resistance, the abrasion volume of Reference Example 13 was used instead of the abrasion volume of Reference Example 1 and the abrasion volume of Example 16 was used instead of the abrasion volume of Examples 1-5 or Comparative Example 1, the index of the abrasion resistance of the vulcanized rubber composition of Example 16 was calculated. The results are shown in Table 13.

TABLE 13

| | | Example 16 | Reference Example 13 |
|---|---|---|---|
| step 1 | styrene-butadiene copolymer rubber (SBR Tufdene 2000) (parts) | 80 | 80 |
| | butadiene rubber (BR01) (parts) | 20 | 20 |
| | silica (Nipsil AQ) (parts) | 70 | 70 |
| | carbon black HAF (parts) | 10 | 10 |
| | stearic acid (parts) | 2 | 2 |
| | zinc oxide (parts) | 3 | 3 |
| | anti-aging agent (parts) | 1.5 | 1.5 |
| | compound (Ib-1) (parts) | 1.24 | — |
| | TDAE oil (parts) | 30 | 30 |
| | compound capable of bonding with silica (parts) | 5.6 | 5.6 |
| step 2 | powdered sulfur (parts) | 1.6 | 2 |
| | CBS (parts) | 1.2 | 1.5 |
| | DPG (parts) | 2 | 2 |
| evaluation | index of low fuel consumption | 97 | — |
| | index of abrasion resistance | 129 | — |

(parts = parts by weight)

Example 17 and Reference Example 14

In the same manner as in Example 1 except that components in the kind and amount shown in Table 14 were used in steps 1 and 2, the vulcanized rubber compositions of Example 17 and Reference Example 14 were obtained. The same description in Tables 1 and 14 shows the same component. As the butadiene rubber, "BR01" manufactured by JSR was used.

<Evaluation of Low Fuel Consumption>

In the same manner as in the above except that, in the above-mentioned formula of the index of low fuel consumption, the tan δ of Reference Example 14 was used instead of the tan δ of Reference Example 1 and the tan of Example 17 was used instead of the tan δ of Examples 1-5 or Comparative Example 1, the index of the low fuel consumption of the vulcanized rubber composition of Example 17 was calculated. The results are shown in Table 14.

<Evaluation of Abrasion Resistance>

In the same manner as in the above except that, in the above-mentioned formula of the index of abrasion resistance, the abrasion volume of Reference Example 14 was used instead of the abrasion volume of Reference Example 1 and the abrasion volume of Example 17 was used instead of the abrasion volume of Examples 1-5 or Comparative Example 1, the index of the abrasion resistance of the vulcanized rubber composition of Example 17 was calculated. The results are shown in Table 14.

TABLE 14

| | | Example 17 | Reference Example 14 |
|---|---|---|---|
| step 1 | styrene-butadiene copolymer rubber (SBR Tufdene 2000) (parts) | 80 | 80 |
| | butadiene rubber (BR01) (parts) | 20 | 20 |
| | silica (Nipsil AQ) (parts) | 60 | 60 |
| | carbon black HAF (parts) | 20 | 20 |
| | stearic acid (parts) | 2 | 2 |
| | zinc oxide (parts) | 3 | 3 |
| | anti-aging agent (parts) | 1.5 | 1.5 |
| | compound (Ib-1) (parts) | 1.24 | — |
| | TDA oil (parts) | 30 | 30 |
| | compound capable of bonding with silica (parts) | 5.6 | 4.8 |
| step 2 | powdered sulfur (parts) | 1.6 | 2 |
| | CBS (parts) | 1.2 | 1.5 |
| | DPG (parts) | 2 | 2 |
| evaluation | index of low fuel consumption | 97 | — |
| | index of abrasion resistance | 142 | — |

(parts = parts by weight)

INDUSTRIAL APPLICABILITY

The rubber composition and vulcanized rubber composition of the present invention are useful for the production of various products (e.g., tire, tire member, vibration-proof rubber, conveyor belt rubber, engine mount rubber etc.).

The invention claimed is:

1. A method of producing a rubber composition, comprising a first step of kneading a rubber component, silica, and a compound represented by the formula (I):

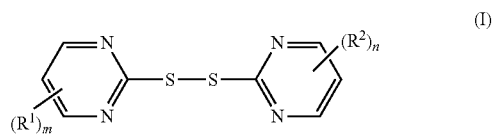

(I)

wherein m and n are each independently 0-3, $R^1$ and $R^2$ are each independently a halogen atom, a $C_{1-18}$ alkyl group optionally having substituent(s), a $C_{3-10}$ cycloalkyl group optionally having substituent(s), a $C_{6-18}$ aryl group optionally having substituent(s), a $C_{7-20}$ aralkyl group optionally having substituent(s), a carboxy group, a $C_{1-18}$ alkoxy-carbonyl group optionally having substituent(s), a $C_{3-10}$ cycloalkyloxy-carbonyl group optionally having substituent(s), a $C_{6-18}$ aryloxy-carbonyl group optionally having substituent(s), a $C_{7-20}$ aralkyloxy-carbonyl group optionally having substituent(s), a carbamoyl group optionally having substituent(s), a hydroxy group, a $C_{1-18}$ alkoxy group optionally having substituent(s), a $C_{3-10}$ cycloalkyloxy group optionally having substituent(s), a $C_{6-18}$ aryloxy group optionally having substituent(s), a $C_{7-20}$ aralkyloxy group optionally having substituent(s), a $C_{1-18}$ alkyl-carbonyloxy group optionally having substituent(s), a $C_{3-10}$ cycloalkyl-carbonyloxy group optionally having substituent(s), a $C_{6-18}$ aryl-carbonyloxy group optionally having substituent(s), a $C_{7-20}$ aralkyl-carbonyloxy group optionally having substituent(s), an amino group optionally having substituent(s), or a nitro group, when m is 2 or 3, multiple $R^1$s may be the same or different, when n is 2 or 3, multiple $R^2$s may be the same or different, to prepare a kneaded composition, and a second step of kneading the kneaded composition with a vulcanization accelerator.

2. The method according to claim 1, wherein $R^1$ and $R^2$ are each independently a $C_{1-18}$ alkyl group optionally having substituent(s), a hydroxy group, a $C_{1-18}$ alkoxy group optionally having substituent(s), a $C_{1-18}$ alkyl-carbonyloxy group optionally having substituent(s), an amino group, or a mono($C_{1-18}$ alkyl-carbonyl)amino group, wherein the alkyl-carbonyl optionally has substituent(s), when m is 2 or 3, multiple $R^1$s may be the same or different, and when n is 2 or 3, multiple $R^2$s may be the same or different.

3. The method according to claim 1, wherein $R^1$ and $R^2$ are each independently a $C_{1-6}$ alkyl group, when m is 2 or 3, multiple $R^1$s may be the same or different, and when n is 2 or 3, multiple $R^2$s may be the same or different.

4. The method according to claim 1, wherein m and n are each independently 0 or 2.

5. The method according to claim 1, wherein the rubber component comprises a diene rubber.

6. The method according to claim 1, wherein the rubber component comprises a styrene-butadiene copolymer rubber.

7. The method according to claim 1, wherein the vulcanization accelerator comprises a sulfenamide vulcanization accelerator.

8. The method according to claim 1, wherein carbon black is kneaded in the first step of kneading.

9. The method according to claim 1, wherein the rubber composition is obtained by further mixing and kneading a sulfur component is kneaded in the second step of kneading.

* * * * *